US008041545B2

(12) United States Patent
Sevastyanov et al.

(10) Patent No.: US 8,041,545 B2
(45) Date of Patent: Oct. 18, 2011

(54) GRADIENT BASED METHODS FOR MULTI-OBJECTIVE OPTIMIZATION

(76) Inventors: Vladimir Sevastyanov, Irvine, CA (US); Oleg Shaposhnikov, Vinnitsa (UA)

( * ) Notice: Subject to any disclaimer, the term of this patent is extended or adjusted under 35 U.S.C. 154(b) by 1159 days.

(21) Appl. No.: 11/506,494

(22) Filed: Aug. 18, 2006

(65) Prior Publication Data

US 2007/0005313 A1 Jan. 4, 2007

Related U.S. Application Data

(63) Continuation-in-part of application No. 11/116,503, filed on Apr. 28, 2005, now Pat. No. 7,593,834.

(60) Provisional application No. 60/710,622, filed on Aug. 23, 2005.

(51) Int. Cl.
*G06F 7/60* (2006.01)
(52) U.S. Cl. .......................................... 703/2
(58) Field of Classification Search .......... 703/2; 700/28; 705/36 R
See application file for complete search history.

(56) References Cited

U.S. PATENT DOCUMENTS

| 7,295,956 | B1 * | 11/2007 | Ruetsch | 703/2 |
| 7,593,834 | B2 * | 9/2009 | Levitan et al. | 703/2 |
| 2005/0187844 | A1 * | 8/2005 | Chalermkraivuth et al. | 705/36 |
| 2006/0033989 | A1 * | 2/2006 | Chugh et al. | 359/385 |

OTHER PUBLICATIONS

Kim et al., "Adaptive Weighted Sum Method for Multiobjective Optimization", 10th AIAA/ISSMO Multidisciplinary Analysis and Optimization Conference, 2004, 13 pages.*

Abbass et al., "PDE: A Pareto-Frontier Differential Evolution Approach for Multi-Objective Optimization Problems", Proceedings of the 2001 Congress on Evolutionary Computation, 2001, pp. 971-978.*
Andersson, J., "A Survey of Multi-Optimization in Engineering Design", Fluid and Mechanical Engineering Systems, Linkoping University, Sweden, LiTH-IKP-R1097, 1997.
Marler, R.T. and Arora, J.S. (2004) Survey of Multi-Objective Optimization Methods for Engineering, Structural and Multidisciplinary Optimization, 26, 6, 369-395.
Pareto, V. 1906: Manuale di Economica ,Politica, Societa Editrice Libraria. Milan; translated into English by A.S. Schwier as Manual of Political Economy. Edited by A.S. Schwier and A.N. Page, 1971. New York: A.M. Kelley.
Holland, J.H. (1975). Adaption in Natural and Artificial Systems. University of Michigan Press: Ann Arbor, MI.
Vanderplaats, G.N., Numerical Optimization Techniques for Engineering Design, McGraw-Hill Book Co., 1984.

(Continued)

*Primary Examiner* — Kamini S Shah
*Assistant Examiner* — Herng-Der Day
(74) *Attorney, Agent, or Firm* — Leonard Tachner

(57) ABSTRACT

Concurrent Gradients Analysis (CGA), and two multi-objective optimization methods based on CGA are provided: Concurrent Gradients Method (CGM), and Pareto Navigator Method (PNM). Dimensionally Independent Response Surface Method (DIRSM) for improving computational efficiency of optimization algorithms is also disclosed. CGM and PNM are based on CGA's ability to analyze gradients and determine the Area of Simultaneous Criteria Improvement (ASCI). CGM starts from a given initial point, and approaches the Pareto frontier sequentially stepping into the ASCI area until a Pareto optimal point is obtained. PNM starts from a Pareto-optimal point, and steps along the Pareto surface in the direction that allows improving a subset of objective functions with higher priority. DIRSM creates local approximations based on automatically recognizing the most significant design variables. DIRSM works for optimization tasks with virtually any (small or large) number of design variables, and requires just 2-3 model evaluations per Pareto optimal point for the CGM and PNM algorithms.

4 Claims, 26 Drawing Sheets

OTHER PUBLICATIONS

Haftka, R.T. and Gurdal, Z., Elements of Structural Optimization, Kluwer Academic Publishers, 1992.

Walsh, G.R., Methods of Optimization, John Wiley 1975.

Weiyu Liu, Development of Gradient-Enhanced Kriging Approximations for Multidisciplinary Design Optimization, Dissertation, University of Notre Dame, 2003.

Simpson, T.W., Peplinski, J., Koch, P.N. and Allen, J.K., Metamodels For Computer-Based Engineering Design: Survey and Recommendations, Engineering with Computers, vol. 17, No. 2 2001, pp. 129-150.

Balabanov, V., Venter G., Multi-Fidelity Optimization With High-Fidelity Analysis and Low-Fidelity Gradients, 10th AIAA/ISSMO Multidisciplinary Analysis and Optimization Conference, Albany, New York, Aug. 30-1, 2004.

M.C. Fu, Optimization For Simulation: Theory vs. Practice, INFORMS Journal on Computing, 2002.

Simpson,.T.W., Booker, A.J., Ghosh, D., Giunta, A.A., Koch, P.N. and Yang, R.-J (2004), Approximation Methods In Multidisciplinary Analysis and Optimization: A Panel Discussion, Structural and Multidisciplinary Optimization 27:5 (302-313).

Box, G.E.P. and Draper, N. R., Evolutionary Operation: A Statistical Method For Process Management, John Wiley & Sons, Inc., New York 1969.

Balabanov, V.O., Giunta, A.A., Golovidov, O., Grossman, B., Mason, W.H. and Watson, L.T., Reasonable Design Space Approach To Response Surface Approximation, Journal of Aircraft, vol. 36, No. 1, 1999, pp. 308-315.

Venter, G., Haftka, R., Starnes, J., Construction Of Response Surface Approximations For Design Optimization. AIAA Journal 36:2242-2249, 1998. P. Vincent and Y. Bengio.

* cited by examiner

Dimensionally Independent Response Surface Method (DIRSM) for gradient calculation

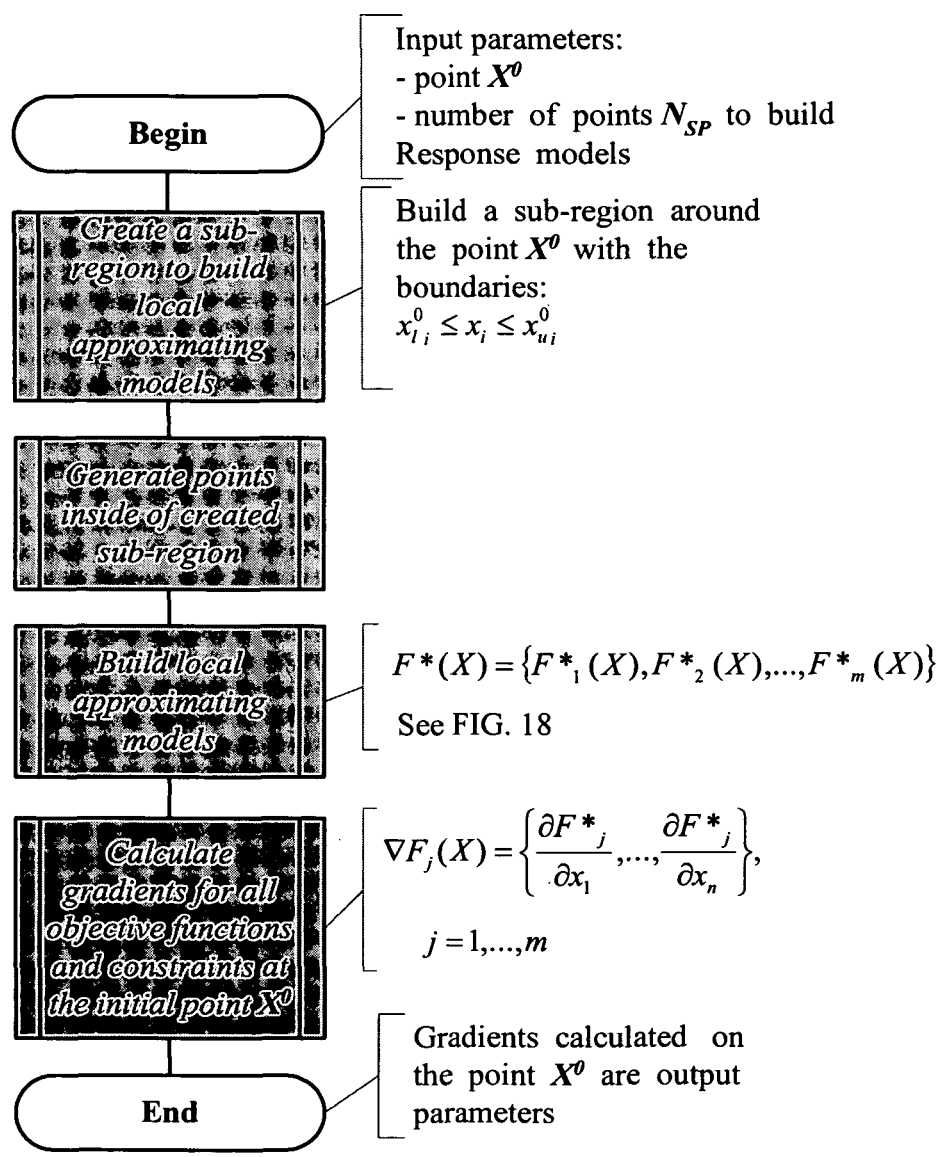

Begin
- Input parameters:
  - point $X^0$
  - number of points $N_{SP}$ to build Response models Create a sub-region to build local approximating models
- Build a sub-region around the point $X^0$ with the boundaries:
  $x^0_{l\,i} \le x_i \le x^0_{u\,i}$ Generate points inside of created sub-region Build local approximating models
- $F^*(X) = \{F^*_1(X), F^*_2(X), \ldots, F^*_m(X)\}$
- See FIG. 18

Calculate gradients for all objective functions and constraints at the initial point $X^0$
- $\nabla F_j(X) = \left\{ \dfrac{\partial F^*_j}{\partial x_1}, \ldots, \dfrac{\partial F^*_j}{\partial x_n} \right\}$,
  $j = 1, \ldots, m$ End
- Gradients calculated on the point $X^0$ are output parameters

FIG. 17

Using Intermediate Points as Part of Pareto-optimal Solution

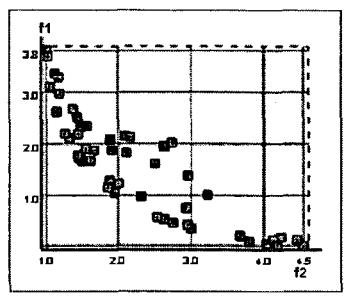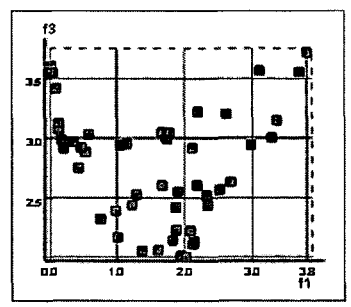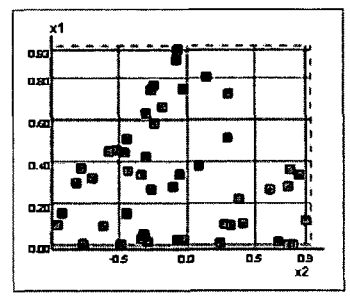
FIG. 20A
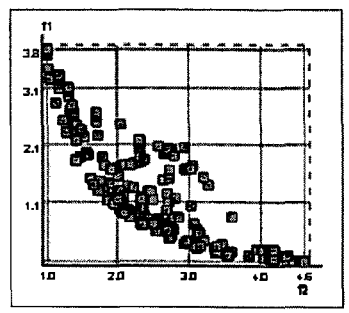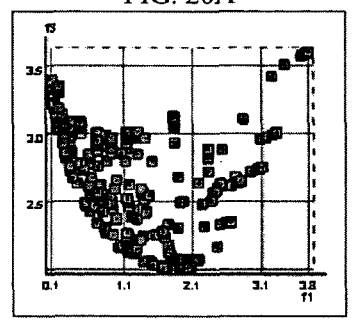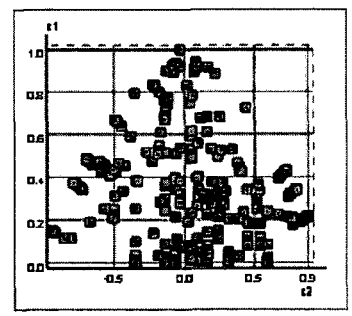
FIG. 20B

GRADIENT BASED METHODS FOR MULTI-OBJECTIVE OPTIMIZATION

CROSS-RELATED APPLICATIONS

This application is a continuation-in-part of Co-pending patent application Ser. No. 11/116,503 filed Apr. 28, 2005. This application takes priority from provisional application serial No 60/710,622 filed Aug. 23, 2005.

BACKGROUND OF THE INVENTION

1. Field of the Invention

The present invention relates to the field of multi-objective optimization methods, and especially to methods of solving large-scale design optimization task.

2. Background Art

Optimization methods started with Newton's method, which was described by Isaac Newton in "De Analysi Per Aequationes Numero Terminorum Infinitas," written in 1669. Since then many methods for optimization of functions have been developed and applied for solving a variety of technical and scientific problems. Modern applied mathematics includes a large collection of optimization methods created over three centuries. An important group of such methods is based on using $1^{st}$ and $2^{nd}$ order derivatives of objective function [5,6,7] (Newton-Ralphson, Steepest descent, Conjugate gradient, Sequential quadratic programming, etc).

Italian economist Vilfredo Pareto introduced the concept of Pareto optimality in 1906 (see below multi-objective optimization problem formulation (1)-(2)). The concept has broad applications in economics and engineering. The Pareto optimality concept became the starting point for a new discipline of multi-objective optimization, which is intended to find trade-offs for several contradicting objectives. For instance, survivability and cost are contradicting objectives in ship design. If survivability is improved then cost may become too high. If the cost is decreased then survivability may become worse. It is important to find a reasonable trade-off for these two objectives, which determines the practical value of the multi-objective optimization concept.

The general multi-objective optimization problem is posed as follows [1]:

$$\text{Minimize: } F(X) = [F_1(X), F_2(X), \ldots, F_m(X)]^T \quad (1)$$

$$\text{subject to: } q_j(X) \leq 0; j=1,2,\ldots k \quad (2)$$

The feasible design space X (often called the feasible decision space or constraint set) is defined as the set $\{X | q_j(X) \leq 0; j=1,2,\ldots k\}$. Feasibility implies that no constraint is violated. Objective functions, also named criteria, $F_i(X)$, $i=1,\ldots,m$ and constraints $q_j(X)$, $j=1,2,\ldots k$ are often called model output variables, or dependent variables.

The dimension of multi-objective optimization tasks can be very different from two-dimensional tasks like the task (A.1.1) to large-scale tasks with dozens of objective functions and thousands of independent variables typical for aerospace, automotive industries, ship design, etc. Today it is impossible to design an airplane, automobile, turbine, or ship without intensive use of multi-objective optimization algorithms. This determines market demand and practical value of efficient multi-objective optimization algorithms.

Attempts to solve such tasks were first based on using well developed gradient-based optimization methods. In order to use those single-objective methods for multi-objective optimization, a scalarization technique was developed, which allowed substitution of multiple objective functions by a weighted exponential sum of those functions. The following is the simplest and the most common form of scalarization for the optimization problem (1):

$$U = \sum_{i=1}^{m} w_i [F_i(x)]^p; F_i(x) > 0; \forall i \quad (3)$$

In the early 1970's John Holland invented Genetic Algorithms (GAs). A genetic algorithm is a heuristic used to find approximate solutions to difficult-to-solve problems through application of the principles of evolutionary biology to optimization theory and other fields of computer science. Genetic algorithms use biologically derived techniques such as inheritance, mutation, natural selection, and crossover. GAs differs from conventional optimization algorithms in several fundamental respects. They do not use derivative or gradient information, but instead rely on the observed performance of evaluated solutions, and the transition rules are probabilistic rather than deterministic.

Thus, there are two groups of known multi-objective optimization methods: scalarization methods and multi-objective genetic algorithms.

1. Scalarization methods use a global criterion to combine multiple objective functions mathematically. These methods require solving a sequence of single-objective problems. The most common method of the group is the weighted sum method.

Use of gradients for determination of direction for the next step works perfectly when a single objective function is optimized. But utilizing the same technique for a weighted sum of multiple objective functions, does not allow controlling values of individual objective functions during the optimization process. It creates serious problems finding evenly distributed Pareto optimal points:

a. The existing weighted sum approaches widely used for design optimization do not work well with the non-convex Pareto surfaces [1], which have been shown to frequently occur in structural optimization and robust design.

b. Uniform distribution of Pareto optimal points cannot be guaranteed even if the weights are varying consistently and continuously. It means that Pareto set will be incomplete and inaccurate [2], which is also follows from FIGS. 1B-1C. This leads to the situation when the best optimal design solution is missed.

Using traditional gradient-based optimization algorithms are computationally expensive. Algorithms SQP and MMFD spend 93-97% of model evaluations for approaching the Pareto-frontier for low-dimensional task (A. 1.1), and only 3-7% of model evaluations return Pareto-optimal points (see FIG. 2A). For high-dimensional tasks computational efficiency is significantly worse, and the number of model evaluations per Pareto-optimal point grows exponentially (see FIG. 3).

2. Multi-objective Genetic Algorithms combine the use of random numbers and information from previous iterations to evaluate and improve a population of points rather than a single point at a time. GAs are based on heuristic strategies not related to the nature of multi-objective optimization. As a result, GAs are:

a. Computationally extremely intensive and resource consuming, which follows from FIG. 2B; Genetic Algorithms NSGA2 (Non-dominated Sorting Genetic Algorithm 2) and FEMO (Fair Evolutionary Multi-objective Optimizer) spend 97-99% of model evaluations to approach the Pareto-frontier for the task (A.1.1), and only 1-3% of model evaluations return Pareto-optimal points;

b. Do not provide adequate accuracy, which follows from comparison of exact solution shown on FIG. 1A with solutions found by NSGA2 and FEMO, and shown in FIGS. 1D-1E; FIG. 2A also illustrates relatively low accuracy of the solutions;

c. Do not provide an objective measure to evaluate divergence of found solutions from true Pareto frontier;

d. GAs cannot be used for high-dimensional optimization tasks with more than 40-50 design variables;

e. The objective of GAs is to find the optimal solution to a problem. However, because GAs are heuristics, the solution found is not always guaranteed to be the optimal solution. See a sample on FIGS. 1D-1E.

Traditional gradient-based optimization methods are designed to solve single-objective optimization tasks. Absence of numerical methods designed specifically for multi-objective optimization, forced engineers to invent an artificial scalarization technique, which substitutes multi-objective optimization tasks by single-objective ones, and allows using traditional gradient-based methods.

For the same reason, engineers started utilizing heuristic GAs for multi-objective optimization. Both approaches are not designed to solve multi-objective optimization tasks and do not have appropriate mathematical foundation, and as result have the above listed disadvantages.

The main optimization concept of both traditional gradient-based methods and GAs is similar: optimization process starts from initial point(s), and approaches Pareto surface in an iterative process. The concept looks simple and obvious, but causes the most substantial problems of existent optimization algorithms:

Accuracy of solution and computational efficiency strongly depend on proper determination of initial points;

There are no efficient methods to determine "good" initial points; mostly, initial points are selected randomly, which makes optimization methods too expensive;

The concept assumes that it is impossible to avoid computationally expensive approaching to Pareto surface; as result, researchers think about how to make optimization algorithms 20-50% faster instead of thinking about a new optimization paradigm, which could improve computational efficiency by orders of magnitude.

Computational time strongly depends on required accuracy.

Computational time exponentially depends on task dimension.

Some tasks cannot be solved, for instance, tasks with multiple local extremums.

Multidisciplinary Design Optimization (MDO) is one of the most practically important fields of optimization technology because it is widely used in aerospace, automotive, turbomachinery industries, ship design. MDO can be defined as a field of engineering that uses optimization methods to solve design problems incorporating a number of disciplines.

Very often MDO is applied to computationally expensive models that need to be optimized. For instance, Ford Motor Company reports that one crash simulation on a full passenger car takes 36-160 hours [9]. The high computational expense of such analyses limits, or even prohibits, the use of such codes in MDO. Consequently, approximation methods are commonly used in engineering design to minimize the computational expense of running such analyses and simulations.

The most often used in MDO approximation techniques includes Response Surface Methodology (RSM), Kriging Models, Artificial Neural Networks, Multivariate Splines, and Radial Basis Functions. All these approaches allow creating explicit approximation functions to objectives and constraints, and then using these when performing the optimization. Once approximations have been constructed they may be used as cheap function evaluators, replacing the underlying computationally expensive analysis tools [10].

RSM and other approximation techniques comprise regression surface fitting to obtain approximate responses, design of experiments to obtain minimum variances of the responses and optimizations using the approximated responses.

All the approximation methods require at least as many evaluations of objective functions as the number of design variables. Otherwise an accurate enough approximation cannot be created. For instance, a common optimization task with 1000 design variables requires 1000 or more evaluations of computationally expensive analysis models. This limits the range of application for the approximation methods to 20-30 design variables [11].

Often referred to as the "curse of dimensionality," a constant challenge in building accurate approximation models is handling problems with large numbers of variables: the more design variables you have, the more samples you need to build an accurate approximation model [13]. A few approaches have been developed to handle problems with large numbers of variables. Screening experiments are often employed to reduce the set of factors to those that are most important to the response(s) being investigated [14]. Box and Draper proposed a method to gradually refine a response surface model to better capture the real function by "screening" out unimportant variables [15]. However, screening methods need an interaction with optimization. For instance, variables that might not be important during initial experimentation may become important in the later stages of the optimization such that the variables that were initially "screened out" need to be added back into the model [13]. The variable-complexity response surface modeling method uses analyses of varying fidelity to reduce the design space to the region of interest [16]. This simplifies creating an accurate approximation for middle size tasks, but still does not work for high-dimensional tasks.

Non-dimensional variables and stepwise regression were used to reduce the complexity and increase the accuracy of the response surface approximations [17]. Additionally, higher-order polynomials were used as response surface approximations, and a detailed error analysis, using an independent data set, is performed. This approach is also not efficient enough, being applied for creating a global approximation of the original model.

All approaches developed to handle problems with a large number of design variables were able to extend the task dimension limit from 20-30 to 40-60, but have not resolved the problem for large-scale tasks. The idea of substituting an original computationally expensive model by a global approximating model for further optimization cannot work for tasks with hundreds and thousands design variables [13].

The present invention offers new a type of gradient-based numerical analysis specifically targeted to solve multi-objective optimization tasks, and named Concurrent Gradients Analysis (CGA). Two multi-objective optimization methods have been invented based on CGA: Concurrent Gradients Method (CGM) and Pareto Navigator Method (PNM). CGM starts from an initial point and approaches the Pareto frontier.

PNM moves along the Pareto frontier instead of approaching it on each step. This idea introduces a new concept of optimization, and allows improving computational efficiency 10-500 times. CGM and PNM are the fastest and the most accurate multi-objective optimization algorithms. The invention offers also Dimensionally Independent Response Surface Method (DIRSM). These invented methods are intended to overcome disadvantages of existent approaches.

1. Andersson J., "A Survey of Multi-objective Optimization in Engineering Design," Fluid and Mechanical Engineering Systems, Linköping University, Sweden, LiTH-IKP-R1097.
2. Marler, R. T., and Arora, J. S. (2004), "Survey of Multi-objective Optimization Methods for Engineering", Structural and Multidisciplinary Optimization, 26, 6, 369-395.
3. Pareto, V.1906: Manuale di Economica Politica, Societa Editrice Libraria. Milan; translated into English by A. S. Schwier as Manual of Political Economy. Edited by A. S. Schwier and A. N. Page, 1971. New York: A. M. Kelley.
4. Holland, J. H. (1975). Adaptation in Natural and Artificial Systems. University of Michigan Press: Ann Arbor, Mich.
5. Vanderplaats, G. N., Numerical Optimization Techniques for Engineering Design, McGraw-Hill Book Co., 1984.
6. Haftka, R. T., and Gurdal, Z., Elements of Structural Optimization, Kluwer Academic Publishers, 1992.
7. Walsh, G. R., Methods of Optimization, John Wiley, 1975.
8. Weiyu Liu, Development of Gradient-Enhanced Kriging Approximations for Multidisciplinary Design Optimization, Dissertation, University of Notre Dame, 2003.
9. Gu, L., "A Comparison of Polynomial Based Regression Models in Vehicle Safety Analysis," ASME Design Engineering Technical Conferences—Design Automation Conference (DAC) (Diaz, A., ed.), Pittsburgh, Pa., ASME, Sep. 9-12, 2001, Paper No. DETC2001/DAC-21063.
10. Simpson, T. W., Peplinski, J., Koch, P. N. and Allen, J. K., "Metamodels for Computer-Based Engineering Design: Survey and Recommendations," Engineering with Computers, Vol.17, No. 2, 2001, pp.129-150.
11. Balabanov, V., Venter G., Multi-Fidelity Optimization with High-Fidelity Analysis and Low-Fidelity Gradients, $10^{th}$ AIAA/ISSMO Multidisciplinary Analysis and Optimization Conference, Albany, N.Y., Aug. 30-1, 2004.
12. M. C. Fu, "Optimization for Simulation: Theory vs. Practice", INFORMS Journal on Computing, 2002.
13. Simpson, T. W., Booker, A. J., Ghosh, D., Giunta, A. A., Koch, P. N., and Yang, R.-J. (2004) Approximation Methods in Multidisciplinary Analysis and Optimization: A Panel Discussion, Structural and Multidisciplinary Optimization, 27:5 (302-313).
14. Welch, W. J., Buck, R. J., Sacks, J., Wynn, H. P., Mitchell, T. J. and Morris, M. D., "Screening, Predicting, and Computer Experiments," Technometrics, Vol. 34, No. 1,1992, pp.15-25.
15. Box, G. E. P. and Draper, N. R., Evolutionary Operation: A Statistical Method for Process Management, John Wiley & Sons, Inc., New York, 1969.
16. Balabanov, V. O., Giunta, A. A., Golovidov, O., Grossman, B., Mason, W. H. and Watson, L. T., "Reasonable Design Space Approach to Response Surface Approximation," Journal of Aircraft, Vol. 36, No.1, 1999, pp. 308-315.
17. Venter, G., Haftka, R, Starnes, J., Construction of response surface approximations for design optimization. AIAA Journal, 36:2242-2249,1998. P. Vincent and Y. Bengio.

SUMMARY OF THE INVENTION

Concurrent Gradients Analysis for multi-objective optimization of objective functions considered in a multi-dimensional domain is provided. CGA's goal is to analyze gradients calculated for each objective function, and determine a step direction, which guarantees simultaneous improvement of all objective functions. CGA is a perfect theoretical and analytical foundation for development of multi-objective optimization algorithms. The invented optimization algorithms based on CGA truly are both more efficient and more accurate—maximizing two seemingly opposing traits at the same time.

Another object of invention is a further development of Concurrent Gradients Method (CGM) for unconstrained multi-objective optimization described in the co-pending patent application (Ser. No. 11/116,503 filed on Apr. 28, 2005). Concurrent Gradients Method for multi-objective optimization is developed based on CGA. CGM sequentially improves a given initial point until Pareto frontier is approached. Concurrent Gradients Analysis is used to determine the direction of each step during the optimization process, which provides unparallel accuracy of found optimal solutions. Reuse of intermediate points improves computational efficiency of CGM, and makes it also the fastest optimization method.

In this disclosure we offer a method of constrained multi-objective optimization with functional and criteria constraints, based on existent CGM algorithm.

According to CGM, optimization process starts from an initial point. If a current point satisfies all functional and criteria constraints, then the optimization process will be performed in a standard way: the first and all following steps will be done in the direction of simultaneous improvement of objective functions until a Pareto-optimal point is found. If a current point violates some constraints, then gradients of such constraints are used similarly to criteria gradients in such a way that the sequence of found points will move into feasible design space where all points satisfy all functional and criteria constraints. The first found feasible point will be used as the initial point for further CGM optimization similar to unconstrained optimization.

During a CGM optimization process, a step cannot be done in a direction that improves some objective functions and makes other ones worse. No objective function gets worse on the next step. This is the main difference and a big advantage compared with traditional gradient-based algorithms, which ignore current value of each objective function, and improve just their weighted sum. This allows significant reduction in the iterations number until an optimal point is found, and improves quality of results. See FIG. 1F with Pareto-optimal points found by CGM method. The points are evenly spread and cover the entire Pareto frontier, which confirms high quality and accuracy of the solution.

Another aspect of invention is a Pareto Navigator Method for multi-objective optimization of objective functions considered in a multidimensional domain. As a method of multi-objective optimization, PNM optimizes m objective functions. But $m^+(m^+<m)$ of them have higher priority. Each PNM iteration comprises two stages:

1) improvement of $m^+$ objective functions with high priority, and finding in this way an initial point for the second stage;
2) improvement starting from the initial point, and optimization of all m objective functions via CGM algorithm.

Basically, the first stage finds a direction and makes a step that improves just $m^+$ objective functions with high priority. The short step guarantees a short distance between the new point and the Pareto surface, which reduces computational cost in the next stage. If the distance between the new point and the. Pareto surface is less than the approximation tolerance then the new point is declared as the next Pareto point, and becomes the initial point for the following iteration. Otherwise a few iterations (mostly 0-2) of CGM optimization need to be performed until the current point approaches the Pareto surface with a pre-assigned accuracy.

In this way PNM introduces a new optimization concept: moving (on each iteration) along the Pareto surface instead of only approaching the Pareto surface. The new concept creates two substantial benefits: a) improves computational efficiency 10-500 times; provides a convenient way to improve any optimal design solution with respect to some objective functions with high priority, while all found solutions remain Pareto-optimal with respect to all objective functions. Moving along the Pareto surface allows keeping a short distance between the current point and the Pareto surface, which provides unparallel computational efficiency.

Evaluation of computational efficiency has been performed for the PNM algorithm. PNM spends just a few iterations (mostly 0-2) to achieve the next Pareto point. PNM has been tested for tasks with 1-5000 design variables, and the number of iterations does not depend on the number of design variables. In terms of objective functions evaluations it requires just 3-100 evaluations per Pareto point, and the number is proportional to the number of design variables. PNM provides unparallel computational efficiency. It finds Pareto-optimal solutions 10-500 times faster compared with any traditional gradient-based or genetic optimization algorithms (see FIG. 2B).

Another aspect of invention is Dimensionally Independent Response Surface Method (DIRSM) allowing one to evaluate objective functions and gradients necessary for any kind of gradient-based optimization algorithms. DIRSM comprises only two steps when performing each iteration: a) calculates higher fidelity models on several sample points generated in a local sub-region; b) automatically builds low fidelity approximating models for all optimized objective functions and constraints.

Majority of models used for optimization tasks in engineering have just a few significant variables (usually 5-10%). Hence, it does not make any sense to include all design variables into approximating models. Recognizing and using only significant design variables decreases the number of required sample points by hundreds of times, and allows high accuracy approximations by substantially smaller computational effort. DIRSM is the first response surface method which is able to do it automatically on each iteration.

DIRSM automatically recognizes the most significant design variables for each objective and constraint function, and builds a list of such variables for each approximated function individually. Then DIRSM builds approximating models based on those variables. Each iteration brings a new list of significant variables, and new local approximating model for each objective function. This ensures simplicity and accuracy of the approximating models, and at the same time, allows reducing the number of required sample points in dozens and hundreds times.

DIRSM is the first response surface method equally efficient with low-dimensional and high-dimensional (thousands of design variables) optimization tasks. This is why it is named Dimensionally Independent Response Surface Method: because efficiency of the method does not depend on the task dimension. In contrast, all prior art response surface methods are limited to 20-30 design variables.

DIRSM makes PNM and CGM capable of solving the most challenging optimization tasks in aerospace, automotive, etc. industries. FIG. 3 enables comparing the computational efficiency of the inventive CGM and PNM algorithms based on DIRSM with computational efficiency of traditional gradient-based algorithms not using DIRSM. CGM and PNM algorithms are 10-800 times faster.

The inventors hereof have invented new type of numerical analysis for multi-objective optimization named Concurrent Gradients Analysis. CGA facilitates finding an area of simultaneous improvement of objective functions. Based on CGA, we developed Concurrent Gradients Method, Pareto Navigator Method, Constrained Concurrent Gradients Method for constrained multi-objective optimization with functional and criteria constraints. DIRSM improves the computational efficiency of CGM, PNM, and any other gradient-based optimization method. CGM, PNM, and DIRSM provide all of the above features.

In accordance with the present invention, a multi-objective optimization system and methods are provided that substantially eliminate or reduce the disadvantages of traditional multi-objective optimization tools.

Still further objects and advantages will become apparent from a consideration of the ensuing description and accompanying drawings.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which:

FIG. 11B shows in detail two steps of the CGM optimization process in the design space for the optimization task (12);

FIG. 17 is a flow diagram of a gradient calculation by Dimensionally Independent Response Surface Method;

FIG. 20A shows 50 Pareto optimal points found by the CGM algorithm for the task (A.4.1); the algorithm spent 15.6 function evaluations per Pareto optimal point;

FIG. 20B shows 501 Pareto optimal points found by CGM algorithm for the task (A.4.1) with reusing intermediate points; the algorithm spent 1.56 function evaluations per Pareto optimal point;

DETAILED DESCRIPTION OF THE PREFERRED EMBODIMENT

Concurrent Gradients Analysis for Point Improvement

Figure 1A:
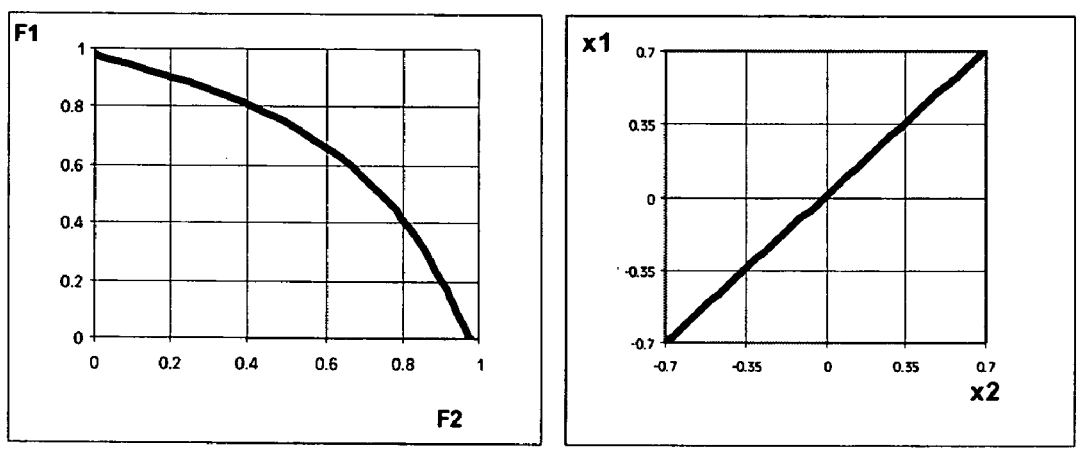
FIG. 1A illustrates an exact solution of the multi-objective optimization task (A.1.1) with non-convex Pareto front.

CGA is a generalization of traditional gradient-based approach for multi-objective optimization, which can be used for solving optimization tasks in any engineering or scientific industry. CGA is the most efficient optimization approach for design of airplanes, automobiles, turbines, ships, etc.

Any traditional gradient-based optimization method comprises sequential steps from initial point to optimal point. Each step improves the current point with respect to the objective function. The most important element of such an algorithm is determination of the direction for the next step. Traditional gradient-based algorithms use the fact that the gradient of the objective function indicates the direction of the fastest increasing of the objective function (see FIG. 4A), but what if several objective functions need to be optimized?

The Concurrent Gradients Analysis method of the present invention determines the area of simultaneous improvement for all objective functions. Any point taken from the area improves all objective functions simultaneously. CGA thus represents a new concept of multi-objective optimization.

Let us consider the multi-objective optimization task (1), and assume that $X^0$ is an initial or a current point, and $G_j$, $j=1, \ldots, m$ are gradients for objective functions $F_j$ which show the improvement direction for corresponded objective functions. The gradients need to be evaluated at the point $X^0$:

$$G_j(X), j = 1, \ldots, m, \text{ where } G_j(X) = \left\{\frac{\partial F_j}{\partial x_1}, \ldots, \frac{\partial F_j}{\partial x_n}\right\}. \quad (4)$$

Evaluation of partial derivatives at the point $X^0 = \{x_1^0, \ldots, x_n^0\}$ for objective functions $F_1, \ldots F_m$ can be performed by the method of finite differences (or any other methods):

$$\frac{\partial F_j}{\partial x_i} = \frac{F_j(x_1^0, \ldots, x_i^0 + \Delta x_i, \ldots, x_n^0) - F_j(x_1^0, \ldots, x_n^0)}{\Delta x_i}, \quad (5)$$

where $i = 1 \ldots n$, $j = 1 \ldots m$, $\Delta x_i = \frac{x_{ui} - x_{li}}{K}$, $K \to \infty$.

Each gradient shows the direction where a corresponding objective function is improving (minimized in the task (1)). Let us consider a plane $L_j(X)$ perpendicular to the corresponding gradient $G_j = \{g_1{}^j, \ldots, g_n{}^j\}$ at the point $x^0$. The plane splits the current sub-region into two parts: area $A_j$ where objective function $F_j(X)$ is increased, and area $B_j$ where $F_j(X)$ is decreased. In reality a surface splits the sub-region into $A_j$ and $B_j$ areas. So, we assume that the sub-region is small enough to use the plane $L_j(X)$ as an approximation of the surface.

Let us formulate an equation of the plane that is perpendicular to the gradient vector $G_j$; we assume that $X^0$ is the origin of coordinates:

$$L_j(X) = g_1{}^j \cdot x_1 + g_2{}^j \cdot x_2 + \ldots + g_n{}^j \cdot x_n \quad (6)$$

All points that satisfy the condition $L_j(X) < 0$ decrease the value of the objective function $F_j(X)$. On another side of the plane all points satisfy the condition $L_j(X) > 0$, and they increase the value of the objective function $F_j(X)$.

Correspondingly, all points satisfying the system of inequalities (7) decrease values of all objective functions simultaneously:

$$\left.\begin{array}{l} L_1(X) < 0 \\ L_2(X) < 0 \\ \ldots \\ L_m(X) < 0 \end{array}\right\} \text{ or } \left.\begin{array}{l} g_1^1 \cdot x_1 + g_2^1 \cdot x_2 + \ldots + g_n^1 \cdot x_n < 0 \\ g_1^2 \cdot x_1 + g_2^2 \cdot x_2 + \ldots + g_n^2 \cdot x_n < 0 \\ \ldots \\ g_1^m \cdot x_1 + g_2^m \cdot x_2 + \ldots + g_n^m \cdot x_n < 0 \end{array}\right\} \quad (7)$$

The system of inequalities (7) is the key point of the Concurrent Gradients Analysis because it generates new knowledge, and allows creating a new theory of multi-objective optimization. For instance, if the system (7) has a solution (the area $B_{SI} X^0$ is not empty) then the point $X^0$ $B_{SI}$ is not Pareto-optimal, and it can be improved by any point taken from the area $B_{SI}$. But if the system (7) does not have a solution (the area $B_{SI}$ is empty) then the point $X^0$ cannot be improved. This means that the point $X^0$ is Pareto-optimal. Thus, the system (7) gives us a new criterion of Pareto-optimality:

The point $X^0$ is Pareto optimal if and only if the area $B_{SI}$ is empty (in other words, if and only if the system (7) does not have a solution for the point $X^0$).

In turn, it gives as enough knowledge to develop a new generation of fast and accurate methods for multi-objective optimization.

Definition: Concurrent Gradients Analysis (CGA) is an analysis of objective functions' gradients based on the system of inequalities (7), and allows for it to determine an area of simultaneous improvement for all the objective functions. There are many forms and implementations of the CGA analysis. Some of them have been invented; other ones will be invented in the future. But if a CGA analysis results in an improved point then it can be used as an element in any multi-objective optimization algorithm. As used herein, the term "concurrent gradients analysis", or "CGA" will therefore be used in this broad definition.

In order to solve main problem of the Concurrent Gradients Analysis, we need to find a point $X' \in B_{SI}$ satisfying conditions (7), which guarantees that the point $X^0$ will be improved by the point $X'$ with respect to all objective functions. Note that in most of optimization tasks the point $X' \in B_{SI}$ should be taken not too far from the initial point $X^0$. Otherwise $X'$ will be worse than the initial point $X^0$. Our methods explained in the following sections solve the problem.

Solving the system of inequalities (7) is a generic approach for finding a complete set of points improving the initial point $X^0$. Any method of numerical or analytical solving systems of inequalities can be utilized. The simplest approach is the Monte Carlo method, which generates a uniformly distributed sequence of points in the sub-region, and filters out the points that do not satisfy the system of inequalities (7).

Unfortunately, such methods require a tremendous amount of calculations and cannot be used on each step of-optimization process. In addition, an optimization algorithm does not need a set of points determined by (7). It needs just a single point satisfying inequalities (7).

In order to find a point satisfying (7) a simple and fast method has been invented. The method is explained in the following section.

Fast Point Selection in the Area of Simultaneous Improvement

Instead of determination entire area of simultaneous improvement we propose to determine a ray starting from the initial point, and crossing the area. Points belonging to the ray improve the initial point, and we need to select one of them on the second step.

The proposed method is based on processing of gradients evaluated at the initial point. This approach does not require solving or even evaluation of the system of inequalities (7), which makes the algorithm several orders of magnitude faster.

Let us consider a graphical interpretation of the method for the simplest multi-objective optimization task with two independent variables and two objective functions that need to be minimized. Our goal is to:

determine the area of simultaneous improvement (decreasing) for both objective functions;

determine the direction of next step in the optimization process;

determine the length of the step.

In this way we will find next point $X' = \{x^*_1, \ldots, x^*_n\}$, which satisfies the system of inequalities (7).

FIG. 4 illustrates how the Concurrent Gradient Analysis works for a sample task with two independent variables and two minimized objective functions. The variables on FIG. 4 have the following meaning:

$\{x_1^0, x_2^0\}$ is a point $X^0$, which needs to be improved CGA;

$G_1$ and $G_2$ are gradients of objective functions $F_1$ and $F_2$ that indicate the direction of maximization for each objective function;

$-G_1$ and $-G_2$ are opposite vectors which are used to determine the direction of minimization for each objective function $F_1$ and $F_2$;

$Xg_1$ ⨯ $Xg_2$-intersection points of gradients $G_1$ and $G_2$ with unit sphere (unit circle for our 2-dimensional sample) with the center at the point $X^0$;

$G^*_{inc}$ is the vector, which indicates the direction of simultaneous increasing of all objective functions;

$G^*$ is the vector, which indicates the direction of simultaneous decreasing of all objective functions;

$A_1$ is the area of points increasing the objective function $F_1$;

$A_2$ is the area of points increasing the objective function $F_2$;

$A_{SI}$ is the area of points increasing both objective functions $F_1$ and $F_2$ simultaneously; $A_{SI}=A_1 \cap A_2$;

$B_1$ is the area of points decreasing the objective function $F_1$;

$B_2$ is the area of points decreasing the objective function $F_2$;

$B_{SI}$ is the area of points decreasing both objective functions $F_1$ and $F_2$ simultaneously; $B_{SI}=B_1 \cap B_2$;

$X'=\{x^*_1, X^*_2\} \in B_{SI}$ is new point candidate, which is decreasing all the objective functions simultaneously.

Figure 4A:
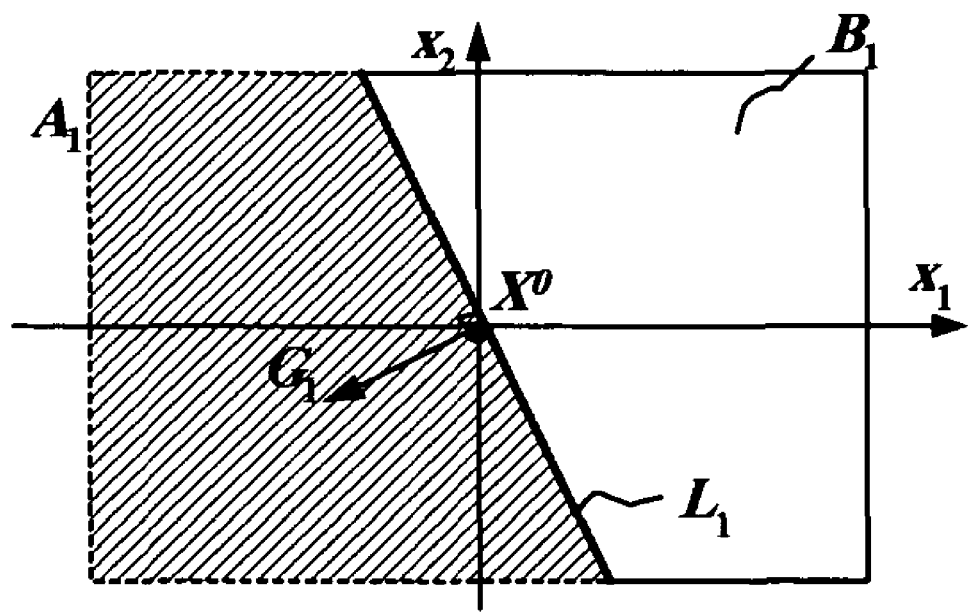
FIG. 4A is a graph which illustrates how the gradient $G_1$ and the line $L_1$ help to split the sub-region into the area of increased values $A_1$ and the area of decreased values $B_1$ for the first objective function.
Figure 4B:
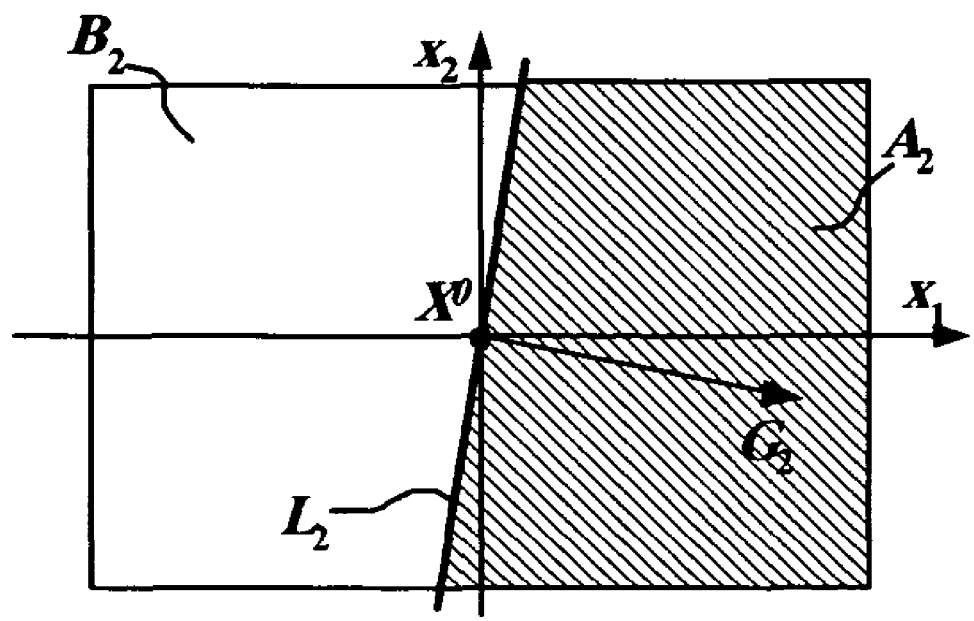
FIG. 4B is a graph which illustrates how the gradient $G_2$ and the line $L_2$ help to split the sub-region into the area of increased values $A_2$ and the area of decreased values $B_2$ for the second objective function.
Figure 4C:
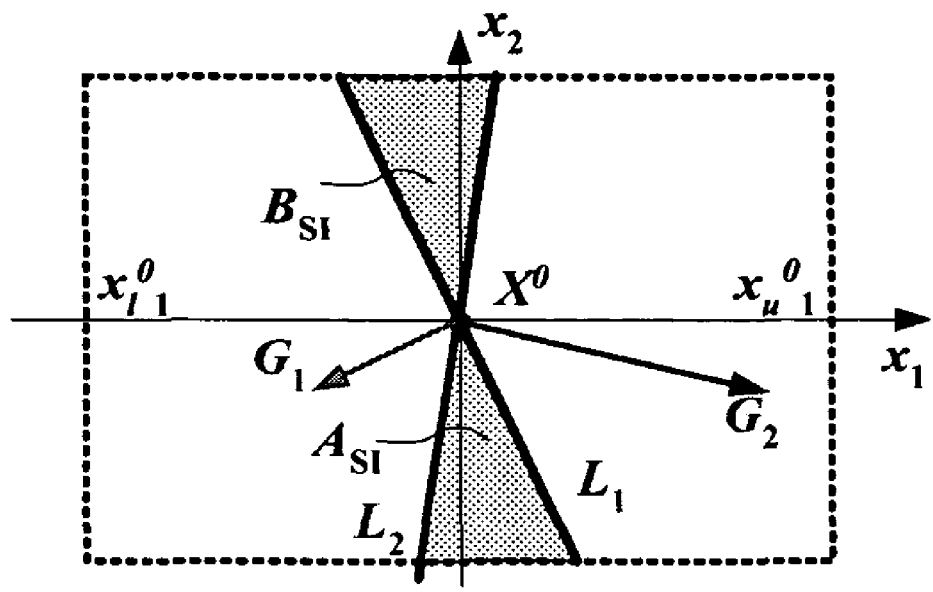
FIG. 4C is a graph which illustrates determination the area of simultaneous increasing $A_{SI}$, and the area of simultaneous decreasing $B_{SI}$ for both first and second objective functions.

FIGS. 4A-4C illustrate how to find the area of simultaneous improvement for both objective functions $F_1$ and $F_2$:

FIG. 4A illustrates the following: calculate the gradient $G_1$ at the point $X^0$ for the objective function $F_1$; create a plane $L_1$ that is perpendicular to the gradient $G_1$; plane $L_1$ is the boundary between area $A_1$ of the points increasing the objective function $F_1$, and area $B_1$ of the points where the objective function $F_1$ is decreased;

FIG. 4B illustrates similar determination of area $A_2$ and $B_2$ for the function $F_2$;

FIG. 4C illustrates that the area of simultaneous increasing for both objective functions $F_1$ and $F_2$ is equal to intersection of areas $A_1$ and $A_2$: $A_{SI}=\bullet A_2$, the area of simultaneous decreasing (improving)—is equal to intersection of areas $B_1$ and $B_2$: $B_{SI}=B_1 \cap B_2$.

Figure 4D:
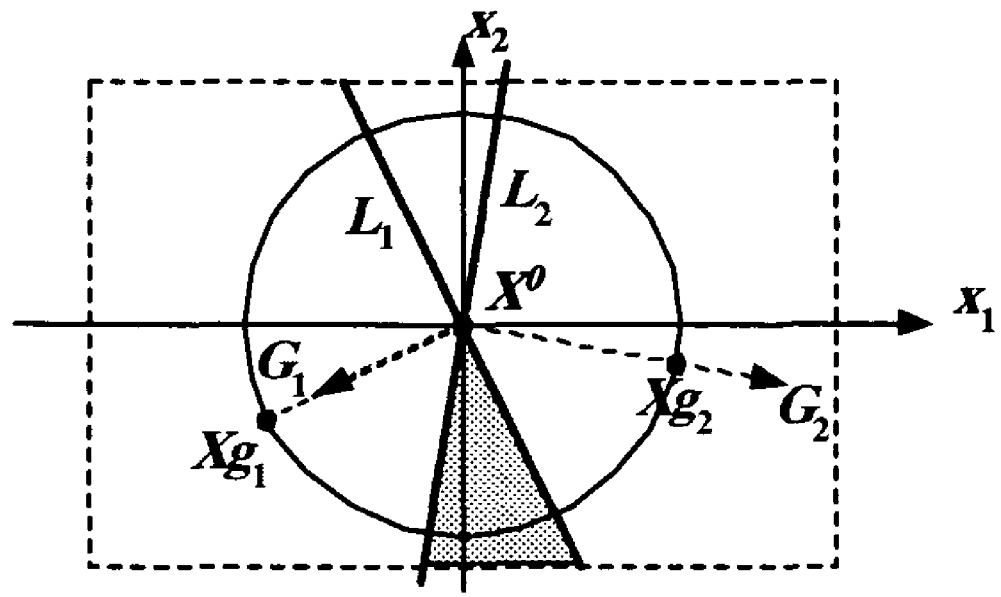
FIG. 4D is a graph which illustrates finding points $Xg_1$ and $Xg_2$ as intersections of gradients $G_1$ and $G_2$ with unit sphere (unit circle in the sample)
Figure 4E:
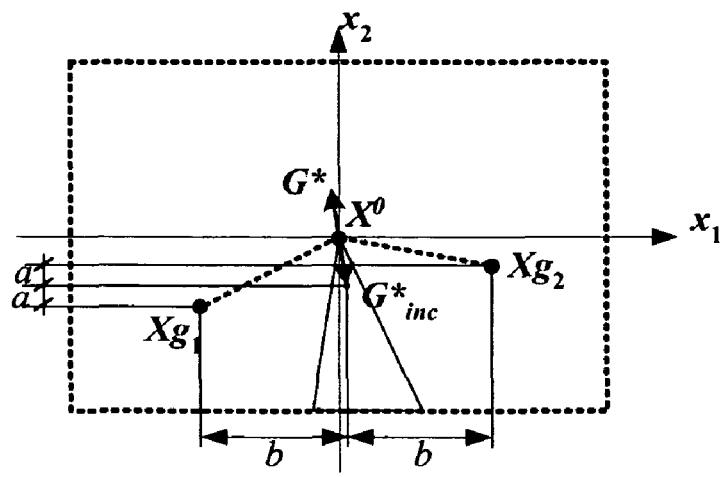
FIG. 4E is a graph which illustrates determination of the vector $G^*_{inc}$, which indicates the direction of simultaneous increasing for all objective functions; the vector $G^*$ indicates the direction of simultaneous decreasing for all objective functions.
Figure 4F:
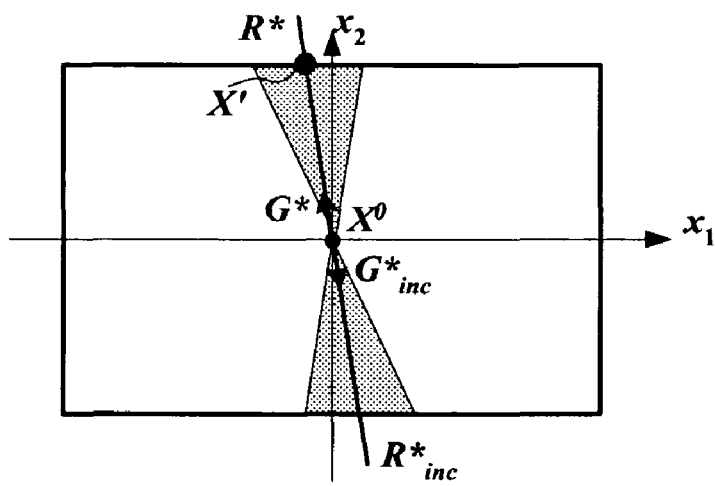
FIG. 4F is a graph which illustrates determination a new improved point-candidate $X'=\{x^*_1, x^*_2\}$ as intersection of the ray $R^*$, coinciding with the vector $G^*$, with the boundary of the sub-region.

FIGS. 4D-4F illustrate how the Concurrent Gradients Analysis finds a new point-candidate in the area $B_{SI}$:

FIG. 4D illustrates finding points $Xg_1$ and $Xg_2$ as intersections of gradients $G_1$ and $G_2$ with unit sphere (unit circle in the sample);

FIG. 4E illustrates determination of the direction of simultaneous improvement for all objective functions; such direction can be calculated as a vector $G^*_{inc}=\{g_1, g_2\}$ for simultaneous increasing, or as a vector $G^*=\{-g_1, -g_2\}$ for simultaneous decreasing of all objective functions, where $g_1, g_2$ is arithmetic mean of maximal and minimal coordinates of points $Xg_1$ and $Xg_2$:

$$g_1 = \frac{\max(xg_1^1, xg_2^1) + \min(xg_1^1, xg_2^1)}{2},$$

$$g_2 = \frac{\max(xg_1^2, xg_2^2) + \min(xg_1^2, xg_2^2)}{2}.$$

FIG. 4F illustrates determination of a new point-candidate $X'=\{x^*_1, x^*_2\}$ as intersection of the ray $R^*$ (which coincides with the vector $G^*=-G^*_{inc}$) with boundaries of the sub-region, which is built with respect to objective functions tolerances $\Delta F_j$.

Figure 4G:
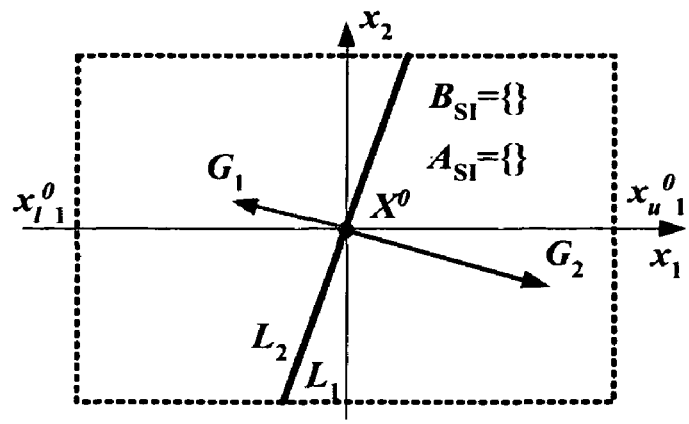
FIG. 4G is a graph which illustrates the situation when the area of simultaneous improvement for all objective functions $B_{SI}$ is empty, and a new point-candidate cannot be found; in this case the initial point $X^0$ is Pareto optimal.

FIG. 4G illustrates the situation when the area $B_{SI}$ of simultaneous improvement for all objective functions is empty, and a new point-candidate $X'=\{x^*_1, x^*_2\}$ cannot be found. In this situation the point $X^0$ is declared as Pareto optimal.

Figure 5:
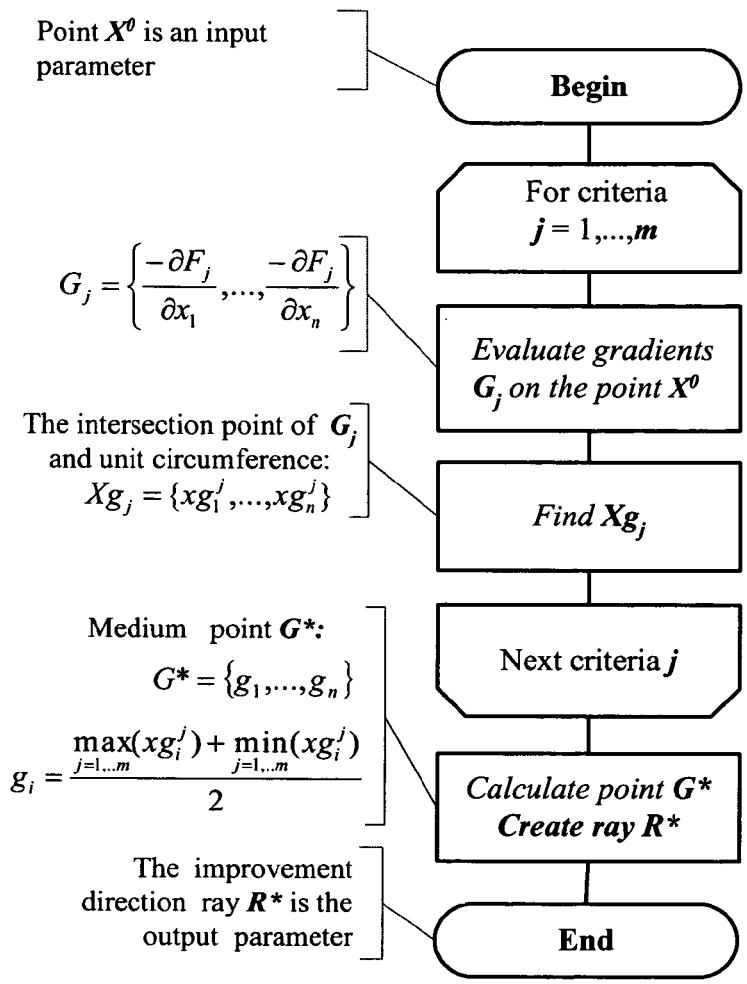
FIG. 5 is a flowchart which shows the schema of Concurrent Gradients Analysis targeted to determine the ray $R^*$ indicating the improvement direction for initial point $X^0$.
Figure 6:
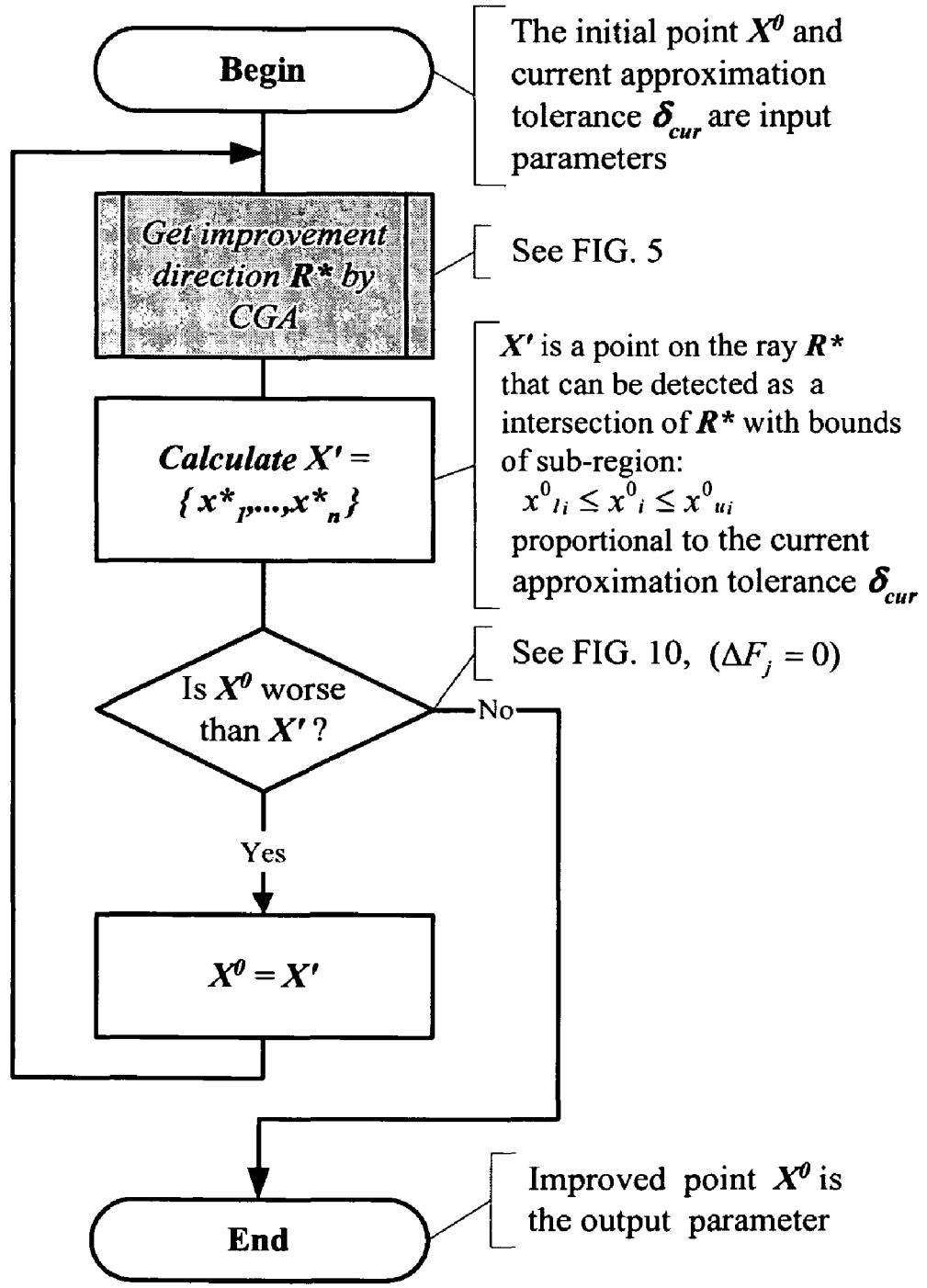
FIG. 6 is a flowchart that shows the schema of creating a new improved point-candidate by Concurrent Gradients Analysis.

In the general case for n independent variables-and m minimized objective functions new point-candidate can be found by means of the Concurrent Gradients Analysis (see FIG. 5 and FIG. 6) in the following way:

1. Calculate the ray $R^*$ coinciding with the vector $G^*=\{g_1, \ldots g_n\}$; $R^*$ indicates a direction of improvement for all objective functions (see FIG. 5):

a. Calculate gradients for all objective functions on the initial point $X^0$:

$$\nabla F_j(X) = \left\{ \frac{\partial F_j}{\partial x_1}, \ldots, \frac{\partial F_j}{\partial x_n} \right\}, j=1, \ldots, m.$$

b. Calculate vectors that indicate direction of improvement for corresponding objective functions: for maximized objective functions $G_j(X)=\nabla F_j(X)$; for minimized objective functions $G_j(X)=-\nabla F_j(X)$.

c. Calculate intersection points $Xg_j$ of vectors $G_j$ with surface of the unit sphere, where $Xg_j=\{xg_1, \ldots, xg_n\}$, $j=1, \ldots, m$.

d. Calculate the vector $G^*=\{g_1, \ldots, g_n\}$, where $$g_1 = \frac{\max_{j=1,\ldots m}(xg_i^j) + \min_{j=1,\ldots m}(xg_i^j)}{2}. \quad (8)$$

e. Create a ray $R^*$ that starts at the initial point $X^0$ and goes through the point $G^*$; $R^*$ indicates a direction of simultaneous improvement for all objective functions:

$$R^*: g_1 \cdot (x_1-x_1^0) + g_2 \cdot (x_2-x_2^0) + \ldots + g_n \cdot (x_n-x_n^0) = 0. \quad (9)$$

Figure 10:
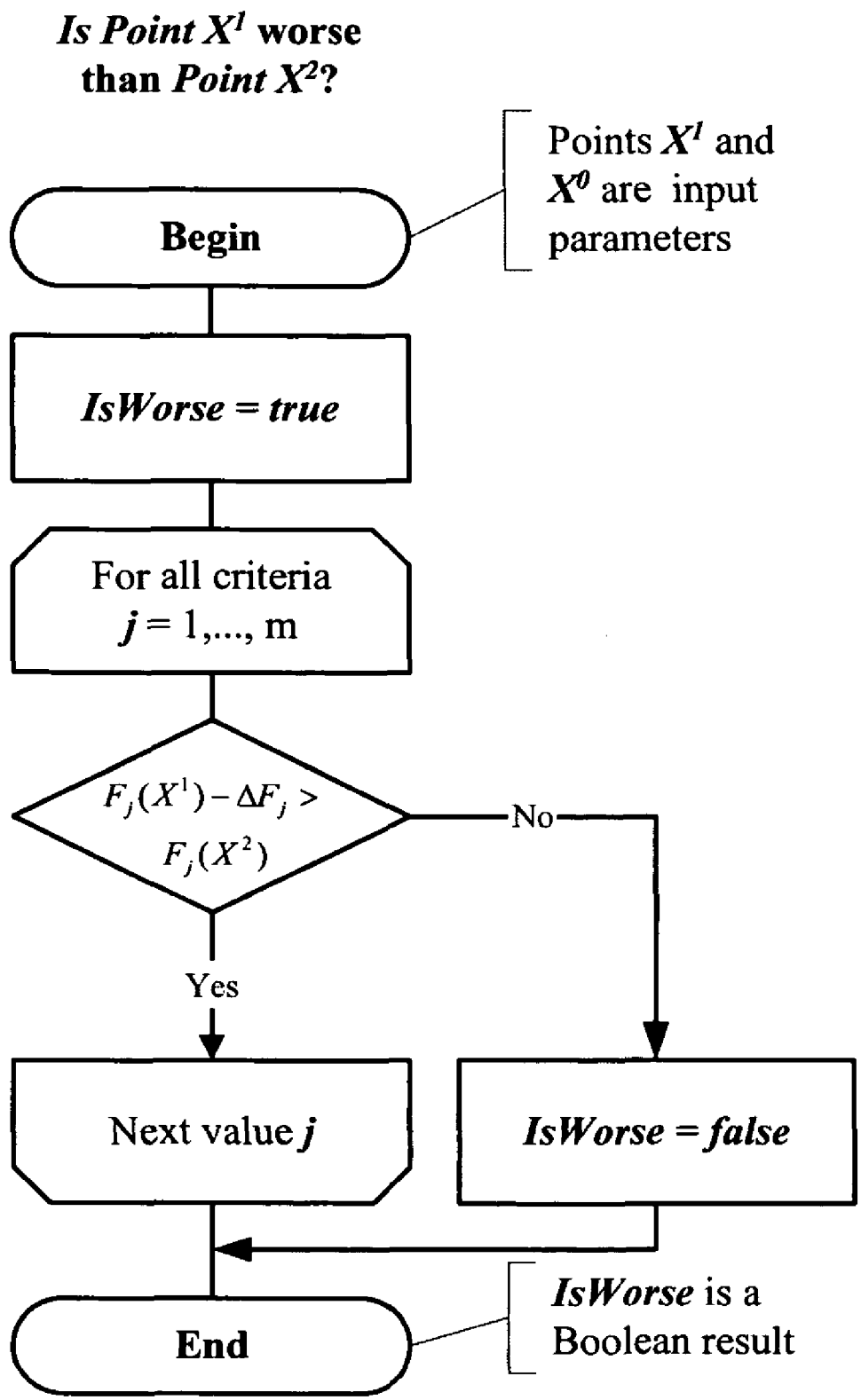
FIG. 10 is a flow chart of determination if one point is worse than another.

2. Now we are ready to step into the area of simultaneous improvement of objective functions, and need to determine the step size. The intention is to determine a point $X'$, which improves initial point $X^0$ (see FIG. 6):

a. Create a sub-region with the center in the initial point $X^0$. The size of the sub-region is inversely proportional to the required accuracy, and is determined by tolerances $\Delta F_j$. Created sub-region has the following boundaries: $x_{1_l}^0 \leq x_i \leq x_{u_i}^0$, $i=1, \ldots, n$.

b. Find new point-candidate $X'$ as intersection of the ray $R^*$ and boundaries of the sub-region.

c. If initial point $X^0$ is worse than point $X'$ with $\Delta F_j=0$ then declare point $X'$ as new initial point: $X^0=X'$ (see FIG. 10 and Co-pending patent application Ser. No. 11/116,503);

d. Point $X^0$ is declared as improved point-candidate; the Concurrent Gradients Analysis process is completed.

Figure 7:
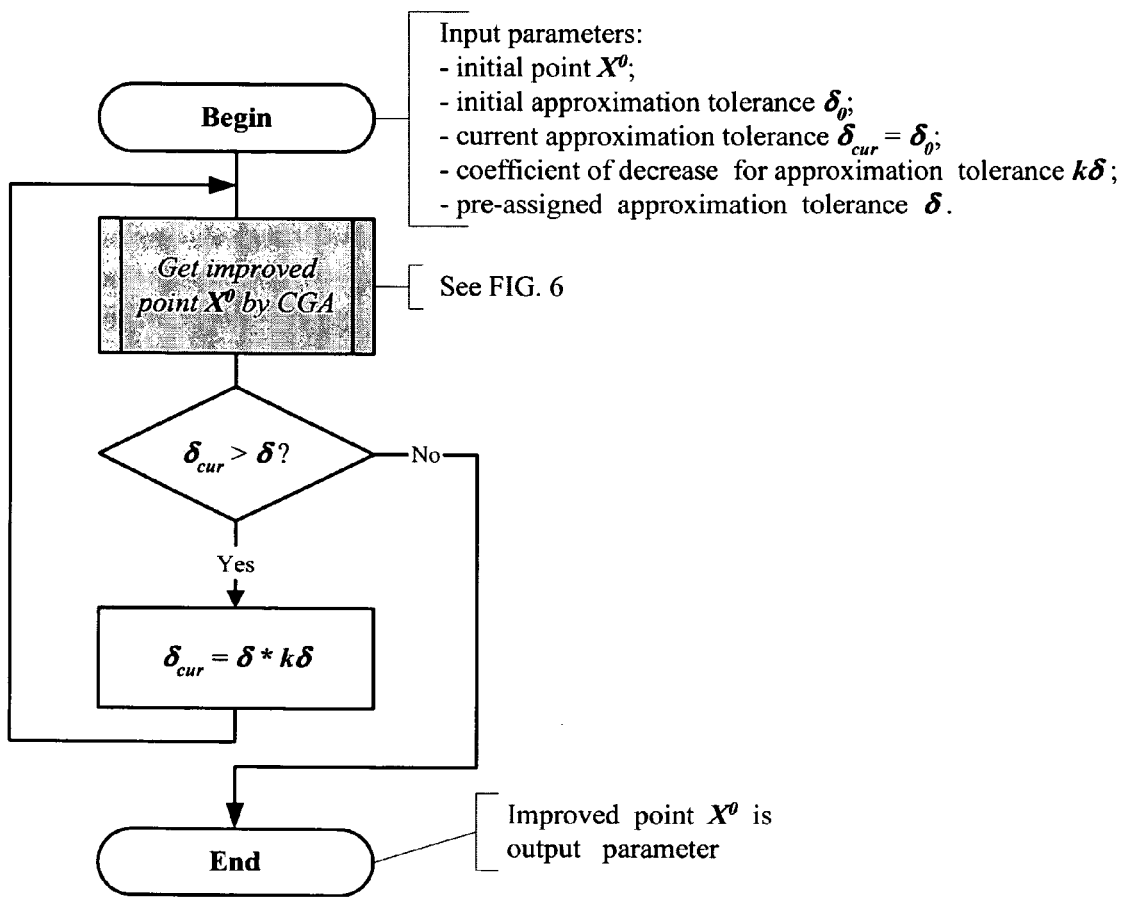
FIG. 7 is a general flowchart of the Concurrent Gradients Analysis.

General schema of the CGA analysis is illustrated on the FIG. 7. The most important detail on this schema is iteratively decreasing the approximation tolerance from initial value $\delta_0$ to pre-assigned approximation tolerance $\delta$.

Gradients $\nabla F_j(X)$, $j=1, \ldots, m$ are necessary on the step 1-$a$), and can be calculated by variety of known ways: via numerical methods, automatic differentiation, Response Surface method, based on local or global approximations of objective functions, and analytically.

While we believe the vector $G^*=\{g, \ldots, g_n\}$ belongs to the area $B_{SI}$ for tasks of any dimension and any number of objective functions, we don't wish to be bound by this. So, here are alternative ways to find points in the area $B_{SI}$.

Area of simultaneous objective functions improvement $B_{SI}$ can be found as solution of inequalities system. Each inequality is determined by the plane surface that is perpendicular to the corresponding gradient (see FIGS. 4A-4C.)

There is a variety of ways to determine points $X' \in B_{SI}$. For example, a few sample points can be taken along the vector $G^*$; the one which delivers better values of objective functions, can be declared as improved point $X'$.

The inventive technique, based on determination of the area of simultaneous improvement for all objective functions, introduces a new type of numerical analysis in multi-objective optimization theory, and allows developing extremely efficient optimization algorithms without using the scalarization technique or any kind of heuristic.

The following two sections demonstrate two inventive multi-objective optimization methods based on the Concurrent Gradients Analysis.

Concurrent Gradients Method for Solving General Multi-Objective Optimization Problem Let us compare sequences of steps typical for traditional gradient-based optimization method with CGM.

Traditional gradient-based optimization algorithm works in the following way:
  Starts from a given initial point;
  Evaluates gradient of the objective function in current point;
  Determines the direction for the next step:
    Takes the direction indicated by the evaluated gradient as the direction for the next step;
  Determines optimal size of the step;
  Makes a step in the direction indicated by the gradient.

Traditional gradient-based optimization algorithms optimize only one objective function, and the gradient perfectly determines the direction of the objective function improvement, as it shown on FIG. 4A.

CGM works as any gradient-based algorithm, but it has multiple objectives to optimize, and it determines the direction for the next step in such a way that all objective functions are improved simultaneously. CGM works in the following way:
  Starts from a given initial point;
  Evaluates gradients of all objective functions in current point;
  Determines the direction for the next step:
    Determines the area of simultaneous improvement $B_{SI}$ for all objective functions; $B_{SI}$ is found based on evaluated gradients (see FIGS. 4A-4C;)
    Determines a ray R* that indicates the direction of the next step inside the $B_{SI}$ area (see FIGS. 4D-4F;)
  Determines optimal size of the step;
  Makes the step in the determined direction inside of the $B_{SI}$ area.

Let us consider the CGM algorithm in detail.

Figure 8:
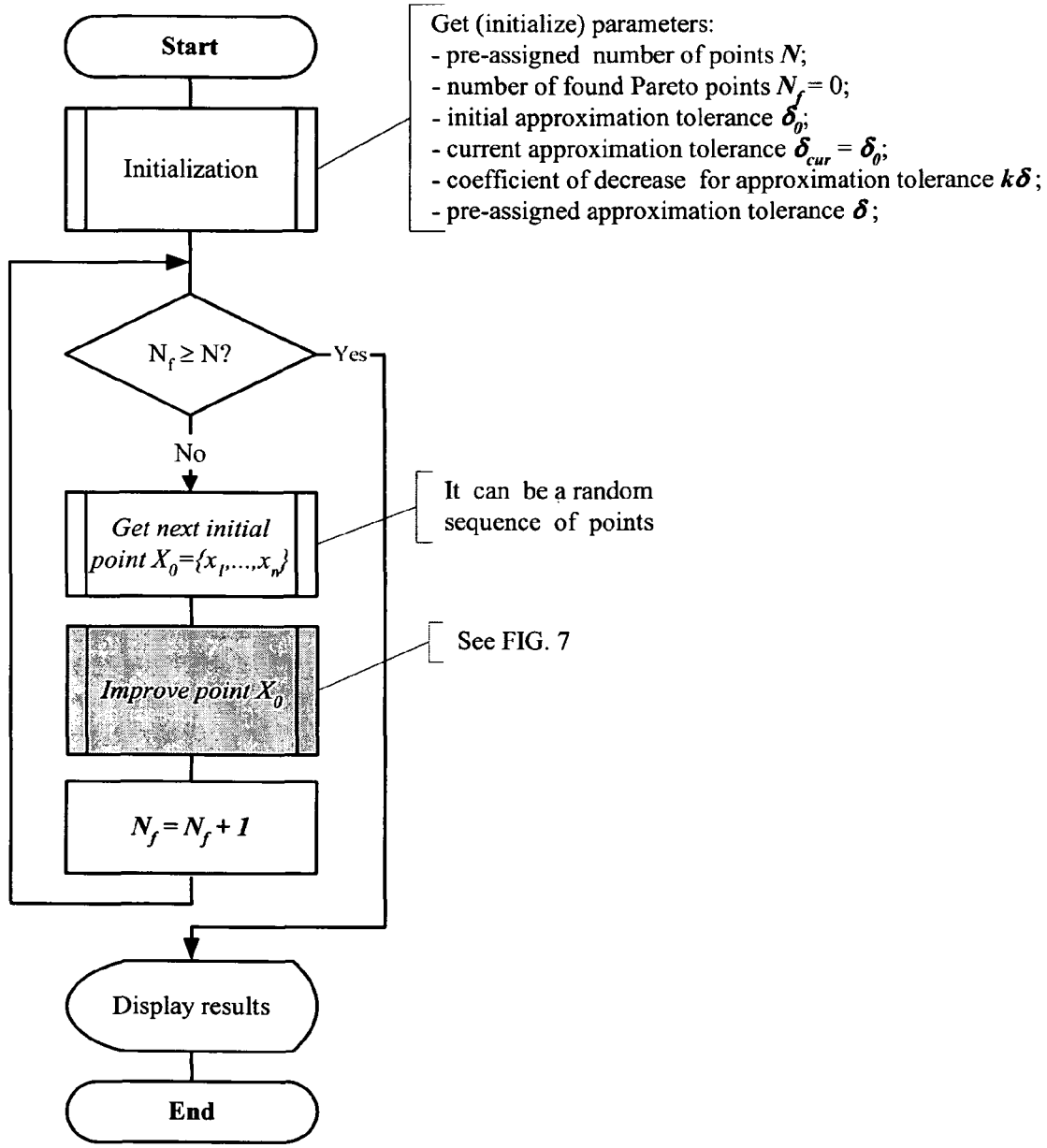
FIG. 8 is a general flowchart of the Concurrent Gradients Method for multi-objective optimization.
Figure 9:
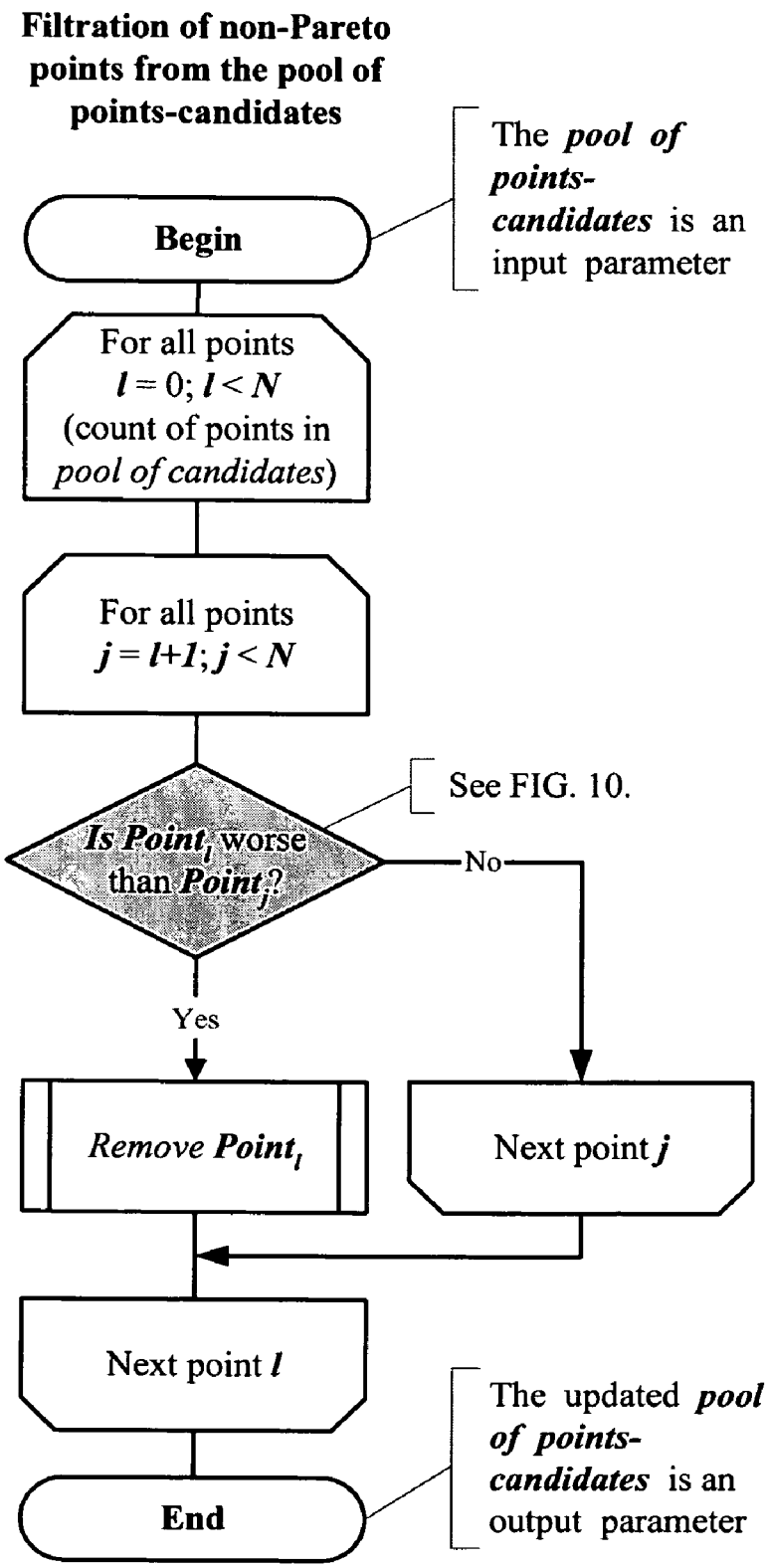
FIG. 9 is a flow chart of filtering out non-Pareto points from the pool of points-candidates.

The general multi-objective optimization problem is posed as (1). The algorithm comprises the following steps (see FIG. 8):
  1. Randomly generate pre-assigned number of initial points in the design space: $\{X_1, X_2 \ldots X_n\}$, i=1;
  2. Start the optimization process from the initial point $X^0 = X_i$, and declare the point as a current point;
  3. Apply the CGA analysis to the initial point $X^0$:
    a) find new point-candidate X';
    b) If point X' is better than current point $X^0$ then declare point X' as new current point: $X^0 = X'$, and continue the improvement process; go to step a) with new current point;
    c) Point $X^0$ is declared as optimal point; the point optimization process is completed.
  4. If i<n then i=i+1; go to step 2.
  5. Use pre-assigned tolerance to compare all found point-candidates against each other with respect to all objective functions, and filter out all non-dominating points (see FIGS. 9-10). Declare all dominating points as Pareto-optimal.
  6. Output all found Pareto optimal points; optimization process is completed.

Note that CGA analysis is a fundamental part of the described above CGM optimization method. Several different implementations of the CGA analysis have been described, and CGM optimization method works with anyone since it results with an improved point on every iteration.

Figure 11A:
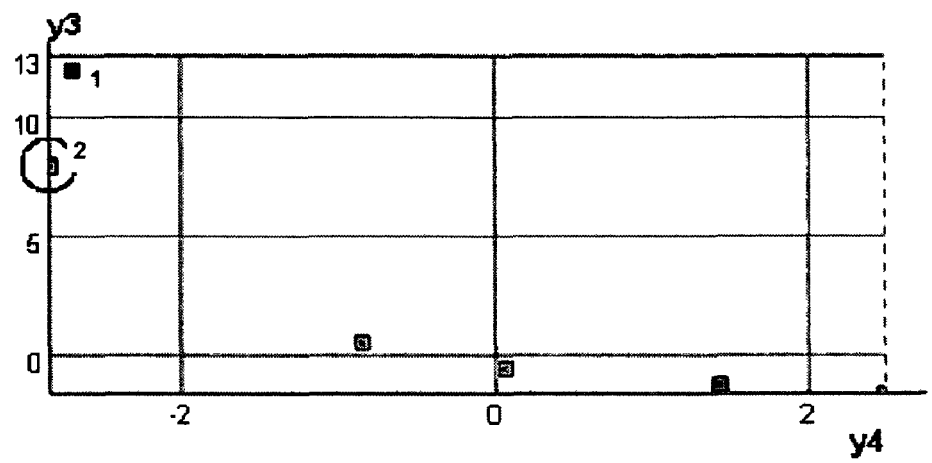
FIGS. 11A and 11B illustrate CGM optimization process for the optimization task (12) with two criteria and two independent variables.

FIG. 11 illustrates the CGM optimization process for the optimization task (12) with two criteria and two independent variables.

$$\text{Minimize: } y_3 = x_1^2 + x_2; \tag{12}$$

$$\text{Minimize: } y_4 = x_1 30 \, x_2;$$

$$-10 \leq x_1, x_2 \leq 10.$$

Figure 11B:
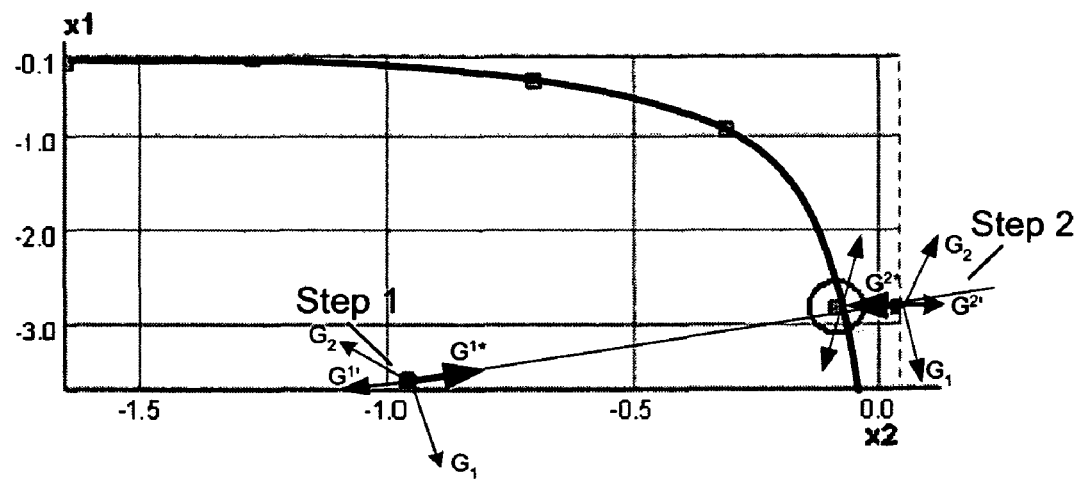

FIG. 11B shows in detail two steps of the optimization process in the design space.

CGM is believed to be first multi-objective optimization algorithm which successfully solves multi-objective optimization tasks with hundreds and thousands of independent variables.

Pareto Navigator Method for Multi-Objective Optimization

Pareto Navigator Method (PNM) is a method of multi-objective optimization based on the ability of Concurrent Gradients Analysis to precisely indicate a direction of simultaneous improvement for several objective functions. PNM takes a Pareto optimal point, and steps along the Pareto surface in such a way that the most important objective functions are improved while other objective functions are slightly compromised.

Let us illustrate capability of PNM on a sample related to ship design. An optimization task with three objective functions has been formulated: survivability S needs to be maximized; cost C and weight W need to be minimized. The task has been solved: S=10.5; C=48.1; W=812. Designers have decided that cost and weight need to be decreased. So, they applied the PNM algorithm to the solution, which needs to be improved, and performed two steps along Pareto surface. This took only five model evaluations. New solution is: S=9.7; C=44.9; W=792. Survivability is slightly compromised, but is still acceptable. Cost and weight of the ship now match designers' expectations.

Figure 12:
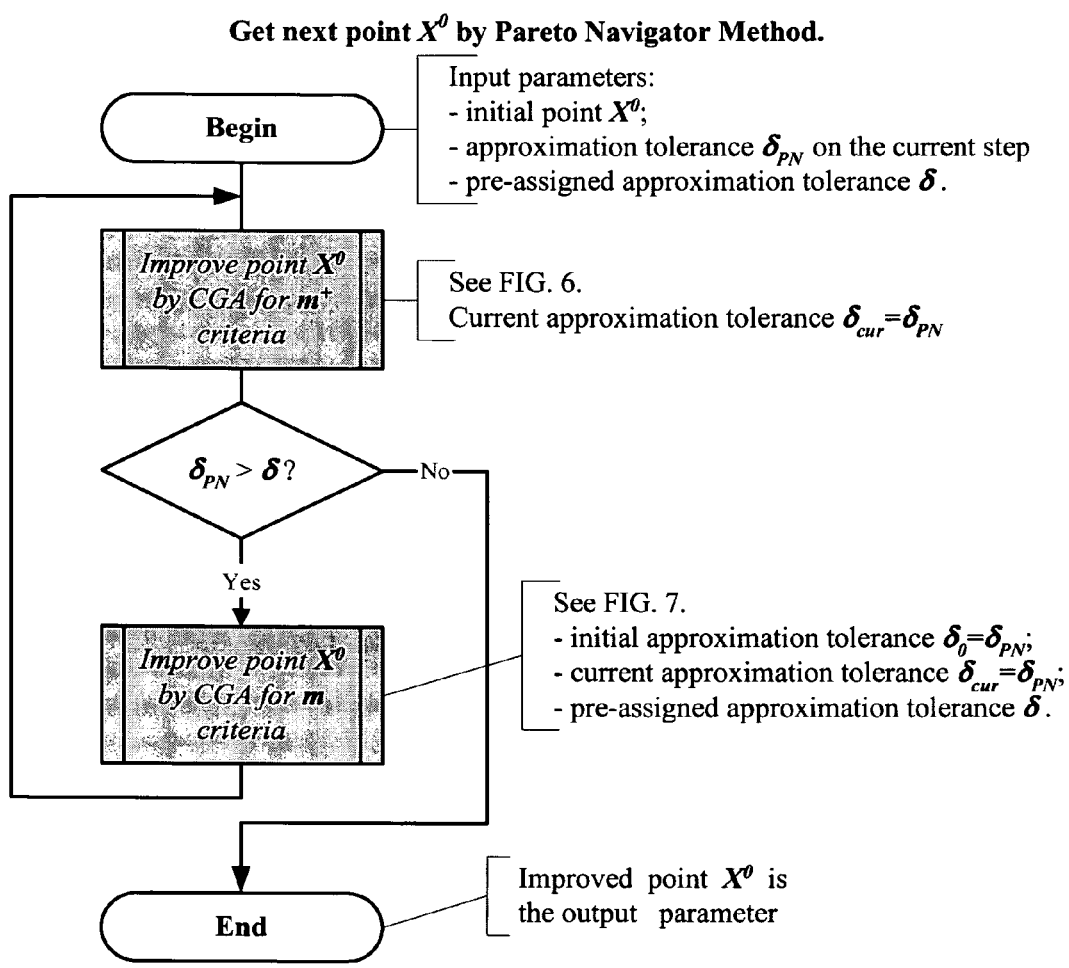
FIG. 12 is a flow diagram of a single iteration of the Pareto Navigator algorithm getting a Pareto-optimal point.
Figure 13:
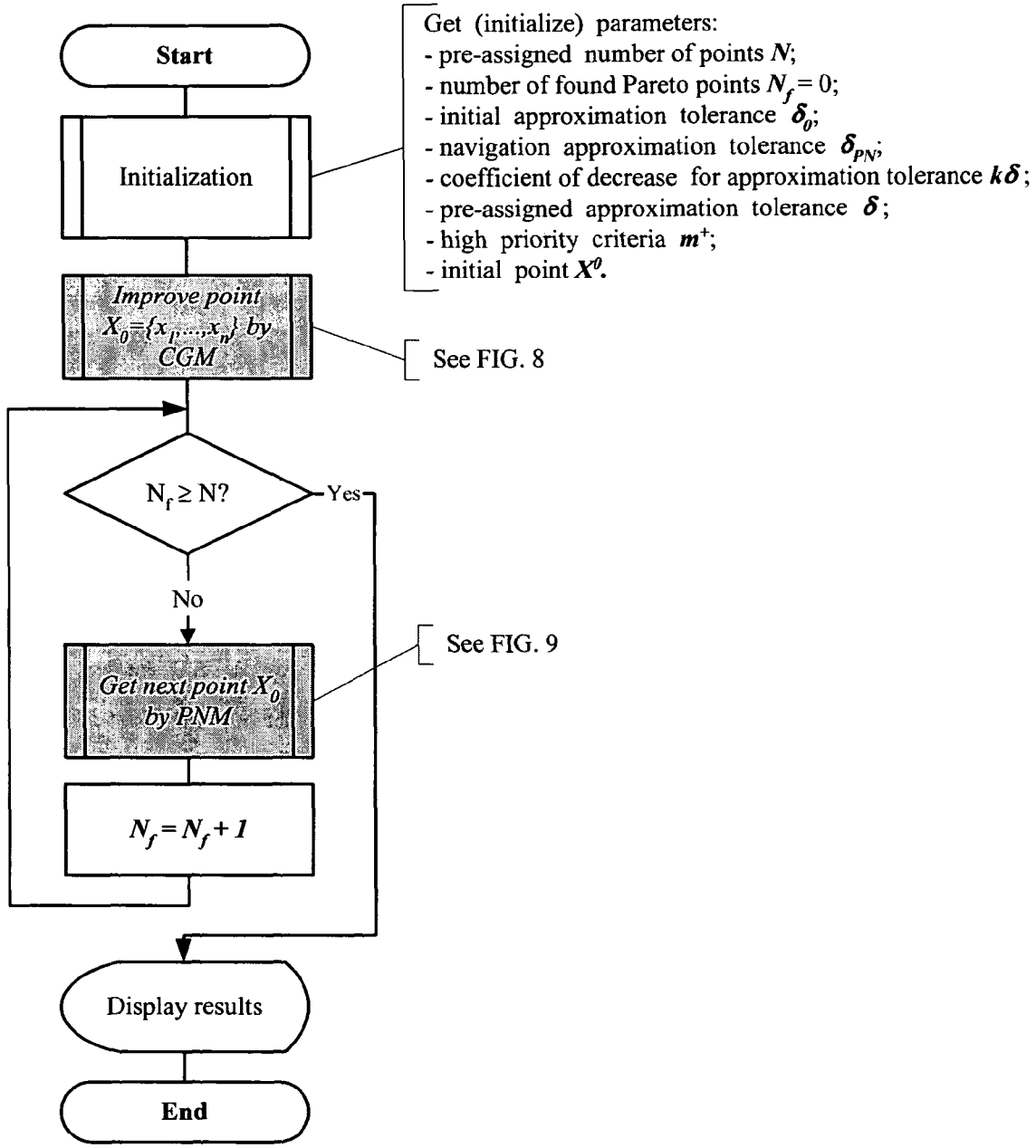
FIG. 13 is a general flowchart of the Pareto Navigator algorithm.

PNM works in the following way: it finds a Pareto-optimal point via CGM method with respect to m objective functions, and then starts moving along Pareto surface in an iterative process (see FIGS. 12-13). Each iteration results in the next Pareto point (see FIG. 12), and comprises two stages: 1) improving $m^+$ objective functions with high priority, where $m^+ < m$; 2) optimization of all m objective functions via CGM algorithm.

The first stage finds a direction and performs a step that improves just $m^+$ objective functions with high priority. The short step guarantees a short distance between the new point and the Pareto surface, which reduces computational cost in the next stage. If the distance between the new point and the Pareto surface is less than the approximation tolerance δ then the new point is declared as the next Pareto point, and becomes the initial point for the following iteration. Otherwise a few iterations (mostly 0-2) of CGM optimization need to be performed until the pre-assigned approximation tolerance δ is achieved.

Let us consider the PNM algorithm in detail.

The general multi-objective optimization problem is posed as (1). Objective functions $F_i(X)$, i=1,2..., $m^+$; $m^+ < m$ are declared as objective functions with high priority.

The algorithm comprises the following steps (see FIG. 13):
  1. Find initial Pareto-optimal point $X_0 = \{x_1, \ldots, x_n\}$ by CGM or any other multi-objective optimization method. $N_i = 1$.

2. Get next Pareto optimal point by PNM algorithm (see FIG. 12):
   a. Apply the CGA analysis to the initial point $X^0$ with respect to the high priority objective functions $F_i(X)$, $i=1,2\ldots,m^+; m^+<m$, and find improved point $X^*=\{x_1^*,\ldots,x_n^*\}$; declare $X^*$ as current point; end optimization if improved point $X^*$ is not found;
   b. Apply the CGA analysis to the current point $X^*$ with respect to all objective functions, and obtain a new point-candidate $X'$;
   c. If point $X'$ is better than current point $X^*$ then declare point $X'$ as new current point: $X^*=X'$, and continue the improvement process; go to step b;
   d. Point $X^*$ is declared as optimal point, and as new initial point: $X^0=X^*$; $N_i=N_i+1$.
3. If $N_i \geq N$ then display results, else-go to step 2.

The PNM algorithm can use two exit conditions: a) pre-assigned number of steps has been exceeded: $N_i \geq N$; b) high priority objective functions have been improved over pre-assigned values.

As it was said earlier, a PNM iteration comprises two stages: improvement of $m^+<m$ objective functions with high priority, and then CGM optimization of m objective functions starting from the found on the first stage point. First PNM stage is very similar to CGM with $m^+$ objective functions, but the step length can be greater or equal to the step size on the second stage.

Optimization task (A.2.1) has been solved by the PNM algorithm. See the task formulation and detailed explanation of the solution in A.2, and graphical illustration of the solution on FIGS. 14A-14B.

Concurrent Gradients Analysis for Constrained Multi-Objective Optimization

The technique of solving of constrained multi-objective optimization tasks is based on the ability of Concurrent Gradients Analysis to precisely indicate a direction of simultaneous improvement for several objective functions. If some functional or criteria constraints are infringed then CGA considers them as objective functions, and starts stepping in a direction where constraints are less infringed. It keeps moving in this direction until no constraints are infringed at all. Then the algorithm starts moving towards the Pareto frontier as a regular CGM does.

The constrained multi-objective optimization problem is formulated in (1)-(2), where: $x_{1_i} \leq x_i \leq x_{u_i}$, $(1 \leq i \leq n)$, m is a number of objective functions and p is a number of inequality constraints.

There are two types of constraints: criteria constraints (2), and functional constraints (13):

$$f_{j_{min}} \leq F_j(X) \leq f_{j_{max}}, 1 \leq j \leq m. \quad (13)$$

Functional constraints (4) can be normalized, or in other words, converted into the form of criteria constraints $q_j(X) \leq 0$.

Let us consider the normalization process.

Functional constraint (13) can be substituted by a system of two inequalities:

$$\begin{cases} f_{j_{min}} - F_j(X) \leq 0; \\ F_j(X) - f_{j_{max}} \leq 0, \end{cases} \quad (14)$$

First inequality in (14) can be written as $q_{j_1}(X) \leq 0$, where $q_{j_1}(X)=f_{j_{min}}-F_j(X)$, and second inequality can be written as $q_{j_2}(X) \leq 0$, where $q_{j_2}(X)=F_j(X)-f_{j_{max}}$. Therefore, optimization task formulation (1)-(2) formulates constrained multi-objective optimization task with both objective functions and functional constraints.

There are many of real life design optimization tasks where criteria and functional constraints should be used in addition to objective functions.

For instance, an airplane needs to be designed in such a way that its price and weight have minimal possible values, but the price is not higher than $15 million, and the weight is lower than 5,000 kilograms. These two constraints set the worst acceptable values for objective functions, and are considered as criteria constraints, or as constraints for objective functions.

If the airplane's wing size is required to be between 7 and 9 meters then functional constraints are more appropriate to use because they allow setting minimum and maximum wing size.

The inventive multi-objective optimization algorithms CGM and PNM are gradient-based, and they can use the same gradient-based technique to handle the constraints $q_j(X) \leq 0$, $(1 \leq j \leq p)$.

The main idea of the gradient-based technique is taking some intermediate steps to satisfy the constraints while a point-candidate $X^*=\{x_1^*,\ldots,x_n^*\}$ is improving on the current iteration. Each such an intermediate step is taken using a set of gradients $G'=\{g_1,\ldots,g_n\}$ for all infringed constraints $q'_j(X) \geq 0$, $(0 \leq j \leq w \leq p)$, where w is the number of currently infringed constraints.

Figure 15:
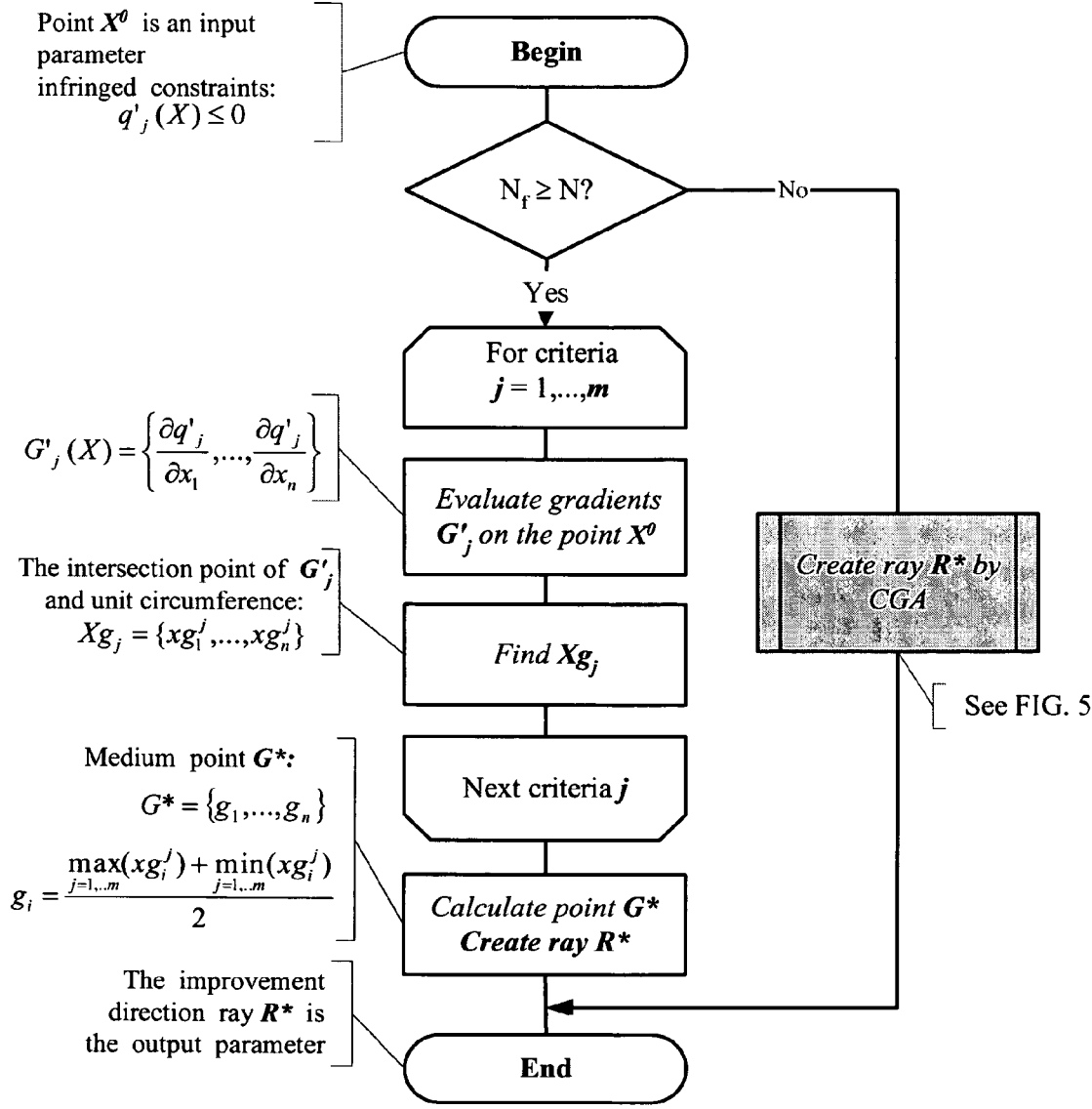
FIG. 15 is a flowchart, which shows how to determine the ray $R^*$ indicating the improvement direction for constrained optimization.

Let us consider the gradient-based technique to determine the ray $R^*$ in detail (see FIG. 15):
  a. Recognize all infringed constraints $q'_j(X) \leq 0$, $(0 \leq j \leq w \leq p)$.
  b. If there are no infringed constraints then start CGA with respect to all objective functions, and determine the ray $R^*$, which indicates a direction towards the Pareto frontier, and can be used for non-constraint optimization (see FIG. 5); end of the ray determination.
  c. If at least one constraint is infringed then evaluate gradients of the infringed constraint functions on current point-candidate $$X^* = \{x_1^*,\ldots,x_n^*\}: G'_j(X), j = 1,\ldots,w, \quad (15)$$

$$\text{where } G'_j(X) = \left\{\frac{\partial q'_j}{\partial x_1},\ldots,\frac{\partial q'_j}{\partial x_n}\right\}.$$

d. Determine the intersection point of $G'_j(X)$ and the unit circumference: $Xg_j=\{xg_1^j,\ldots,xg_n^j\}, j=1,\ldots,w$
  e. Calculate the vector $G^*=\{g_1,\ldots,g_n\}$, where $$g_i = \frac{\max_{j=1,\ldots w}(xg_i^j) + \min_{j=1,\ldots w}(xg_i^j)}{2}, ;$$

f. Calculate the ray $R^*$ based on projections of the $G^*$: $R^*: g_1 \cdot (x_1-x_1^0)+g_2 \cdot (x_2-x_2^0)+\ldots+g_n \cdot (x_n-x_n^0)=0$; the ray indicates a direction towards an area with no violated constraints; end of the ray determination.

The algorithm of constrained multi-objective optimization can be described also in terms of CGA analysis:
1. Start from a given initial point $X^0$; declare $X^0$ as current point: $X^*=X^0$.
2. Recognize all violated constraints for the current point.

3. If there are such constraints then apply CGA with respect to all functions with infringed constraints, and perform a step toward an area with no infringed constraints;

4. Find an improved point $X^*=\{x_1^*,\ldots,x_n^*\}$, and declare $X^*$ as new current point; go to step 2.

5. If no constraints are infringed then apply CGA analysis to the current point $X^*$ with respect to all objective functions, and obtain a new point-candidate $X'$;

6. If point $X'$ is better than current point $X^*$ then declare point $X'$ as new current point: $X^*=X'$; go to step 2;

7. Point $X^*$ is declared as optimal point, end of optimization process.

Figure 16A:
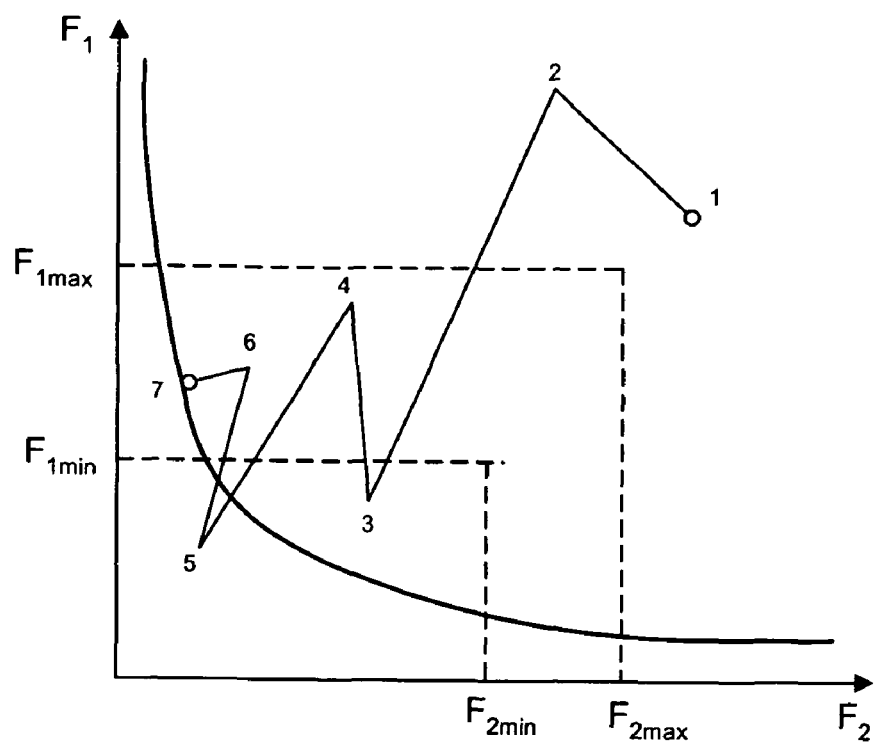
FIG. 16A shows 2 trajectories of an optimization process with criteria constraints.

FIG. 16A shows a trajectory of optimization process from an initial point to the Pareto surface when a criteria constraint is infringed. Whenever a constraint is violated, the algorithm starts using gradients of violated constraints, and changes the direction of next step in such a way that the current point moves into a feasible area where no constraints are infringed. After that regular optimization continues.

Figure 16B:
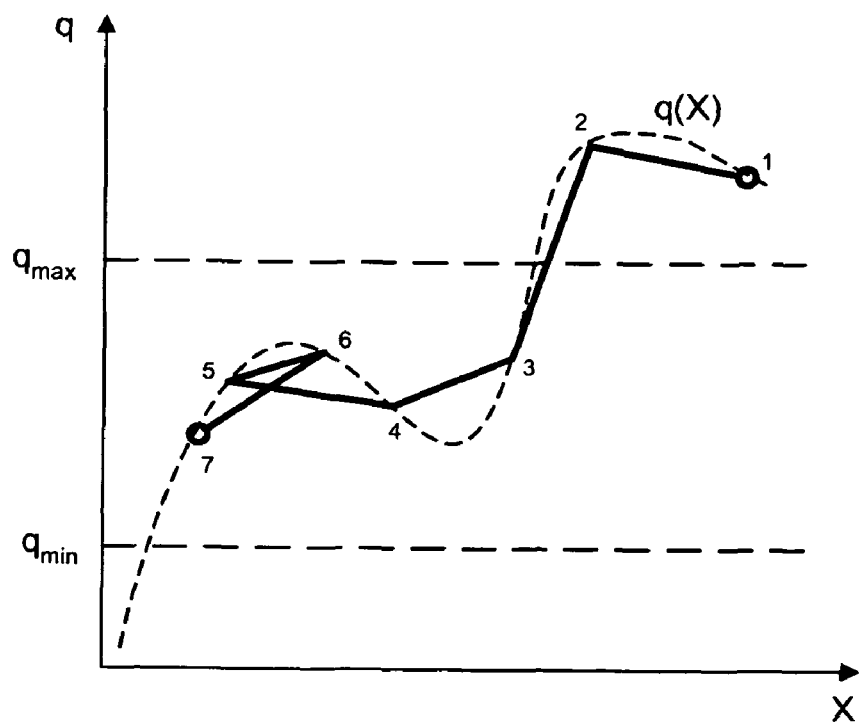
FIG. 16B shows a trajectory of an optimization process with functional constraints.

FIG. 16B shows that the described above gradient-based technique works similarly when functional constraints are violated.

Dimensionally Independent Response Surface Method

Dimensionally Independent Response Surface Method (DIRSM) allows one to evaluate objective functions and gradients necessary for any kind of gradient-based optimization algorithms, and for optimization tasks with virtually any (small or large) number of design variables.

Design of airplanes, automobiles, and ships requires optimization of very complex mathematical models, which in turn necessitates evaluating such models hundreds and thousands of times. Each evaluation takes many hours and even days of computational time. So, optimization of such expensive models becomes impossible. DIRSM reduces the number of necessary evaluations by dozens and hundreds times, and allows solving more complex tasks than was ever possible. DIRSM in combination with CGA revolutionalize design of airplanes, automobiles, and other complex design objects.

There is a famous problem named "curse of dimensionality" (Bellman 1961), and related to all high-dimensional tasks. The problem refers to the exponential growth of hyper-volume as a function of dimensionality. In terms of response surface methods, this requires an impractically huge amount of sample points that are necessary in high dimensions to cover design space and create sufficiently accurate global approximations. The curse of dimensionality is the reason for the 20-30 variables limitation for all prior art response surface methods.

A simpler, but sometimes very effective, way of dealing with high-dimensional tasks is to reduce the number of dimensions by eliminating some design variables that seem irrelevant. Most of high-dimensional optimization tasks have just a few significant design variables. Recognizing such variables and using them for creating approximations allows reduction of design space dimension without considerable loss of accuracy of approximations. This can be used as an efficient approach in design optimization.

Therefore, the most important DIRSM's features are a) reduction of design space dimension by taking in account only the most significant design variables; b) reducing design space volume by building local approximations in small sub-regions; c) building local approximations by a sophisticated regression model building algorithm. The model-building algorithm uses available sample points to identify the most significant variables, and to find the best way to include the variables in the formula of the approximating model.

DIRSM is efficient with low-dimensional optimization tasks as well. In this case DIRSM does not have to eliminate any variables, which improves accuracy of approximations and overall quality of optimal solutions.

DIRSM is a sequential algorithm. Each iteration starts from creating the next sub-region, and local approximations for all objective and constrained functions.

The model-building algorithm performs two main steps for each local approximating model:
- Recognizes the most significant design variables that need to be included into the approximating model for current sub-region, and filters out less significant variables;
- Finds the best way to include selected variables into the regression model formula in order to improve its accuracy.

Very often the next sub-region has a slightly different list of the most significant variables, which depends on local behavior of the approximated function. Therefore, it is important to update the set of involved design variables, and build a new approximating model formula individually for each sub-region, and for each objective function.

DIRSM can be used for evaluation of objective and constraint functions, and evaluation of their gradients as well. But in current implementation, CGM and PNM utilize just ability of DIRSM to evaluate gradients. So, we will concentrate on gradients evaluation in further explanations.

We will use designations CGM-RS and PNM-RS for the CGM and PNM algorithms based on the invented DIRSM method.

DIRSM is a generic response surface method. Any gradient-based single-objective or multi-objective optimization algorithms, including traditional algorithms based on scalarization technique, can use DIRSM for improving computational efficiency and solving more complex high-dimensional tasks. Multi-objective optimization tasks include multiple objective and constraint functions, and DIRSM builds local approximating models for each such function. Single-objective optimization algorithms need just one approximating model for the objective function, and multiple approximating models for constraint functions.

Let us consider in detail evaluation of gradients performed via DIRSM (see flowchart of FIG. 17):

1. Create a sub-region with the center in the initial point $X^0$. The size of the sub-region is inversely proportional to the required accuracy, and is determined by tolerances $\Delta F_j, j=1,\ldots,m$, and by extension coefficient $\delta k \geq 1$. Created sub-region has the following boundaries:

$$x_{1_i}^0 \leq x_i \leq x_{u_i}^0; i=1,\ldots,n.$$

$$x^0_{1_i}=x_i^0-(x_{u_i}-x_{1_i})\cdot\delta_i\cdot\delta k;$$

$$x^0_{u_i}=x_i^0+(x_{u_i}-x_{1_i})\cdot\delta_i\cdot\delta k.$$

2. Generate $N_{SP}$ random sample points inside the sub-region to build response models.

3. Start model-building algorithm (see the algorithm description below), and create a local approximating regression model for each objective function and functional constraint: $F^*_j(X)$; j=1,2, ... m, $q^*_i(X)$; i=1,2, ... k.

4. Calculate gradients for all objective functions and functional constraints at the initial point $$X^0: \nabla F_j(X) = \left\{ \frac{\partial F^*_j}{\partial x_1}, \ldots, \frac{\partial F^*_j}{\partial x_n} \right\}, \quad j = 1, \ldots, m,$$

$$\nabla q_i(X) = \left\{ \frac{\partial q^*_j}{\partial x_1}, \ldots, \frac{\partial q^*_j}{\partial x_n} \right\}, \quad i = 1, \ldots, k.$$

In further explanations we will use the term model's output variables as a generalized term for objective functions and functional constraints.

We use a modification of forward stepwise regression algorithm as a model-building technique. Stepwise regression is a technique for choosing the variables, i.e., terms, to include in a multiple regression model. Forward stepwise regression starts with no model terms. At each step it adds the most statistically significant term (the one with the highest F statistic or lowest p-value) until none is left. Our approach consequently builds each term via multiplying it by different variables, and finding in this way the most significant variables to include in the term. The number of variables included in a term, and the number of terms have pre-assigned values.

Figure 18:
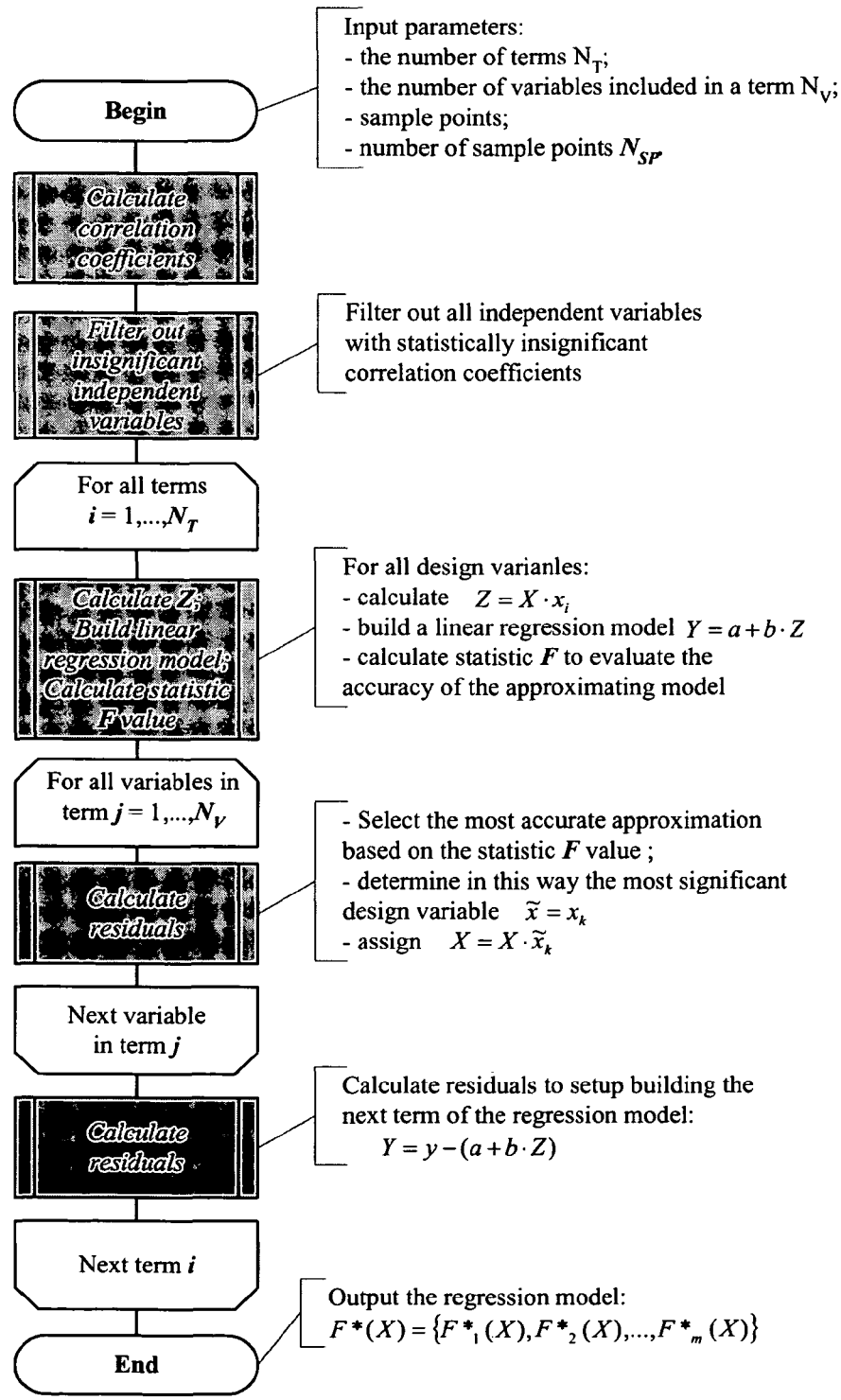
FIG. 18 is a flow diagram of a model-building algorithm employed by the Dimensionally Independent Response Surface Method.

Let us consider the model-building algorithm in detail (see FIG. 18):
1. Initialize input parameters: the number of terms $N_T$; the number of variables included in a term NV; sample points; Y=y; X=1; i=1; declare first term as current term;
2. Calculate correlation coefficients of the dependent variable with each independent variable; filter out all independent variables with statistically insignificant correlation coefficients;
3. Build current term:
    a. $Z=X \cdot x_i$;
    b. solve regression analysis problem, and calculate regression coefficients for the approximating model $Y=a+b \cdot Z$;
    c. calculate F statistic to evaluate the accuracy of the approximating model;
    d. repeat steps a)-c) for each design variable i=2, ..., n;
    e. select the most accurate approximation based on the value of F statistic, and determine in this way the most significant design variable $\tilde{x}=x_k$; assign $X=X \cdot \tilde{x}_k$;
    f. repeat steps a)-e) $N_V$ times;
    g. calculate residuals to setup building the next term of the regression model: $Y=y-(a+b \cdot Z)$;
4. Repeat step 3 $N_T$ times;
5. Output the regression model, which includes just the most significant design variables.

In order to demonstrate capability of the stepwise model-building algorithm we have recreated a typical situation for the DIRSM algorithm. Eight sample points were generated in a sub-region created in 6-dimensional design space $X=\{x_1, x_2, x_3, x_4, x_5, x_6\}$ with a single dependent variable $y_{exp}$ (see TABLE 1). It is necessary to build an approximating model for the dataset.

TABLE 1

| # | $x_1$ | $x_2$ | $x_3$ | $x_4$ | $x_5$ | $x_6$ | $y_{exp}$ | y |
|---|---|---|---|---|---|---|---|---|
| 1 | 0.5000 | 0.5000 | 0.18750 | 0.5000 | 0.68750 | 0.5000 | 0.500000 | 0.473333 |
| 2 | 0.2500 | 0.7500 | 0.93750 | 0.7500 | 0.43750 | 0.7500 | 0.531250 | 0.609984 |
| 3 | 0.7500 | 0.2500 | 0.43750 | 0.2500 | 0.93750 | 0.2500 | 0.718750 | 0.719675 |
| 4 | 0.1250 | 0.6250 | 0.31250 | 0.8750 | 0.56250 | 0.1250 | 1.066406 | 1.001883 |
| 5 | 0.6250 | 0.1250 | 0.81250 | 0.3750 | 0.06250 | 0.6250 | 0.269531 | 0.268657 |
| 6 | 0.3750 | 0.3750 | 0.06250 | 0.1250 | 0.81250 | 0.8750 | −0.378906 | −0.407151 |
| 7 | 0.8750 | 0.8750 | 0.56250 | 0.6250 | 0.31250 | 0.3750 | 1.417969 | 1.423207 |
| 8 | 0.0625 | 0.9375 | 0.40625 | 0.3125 | 0.46875 | 0.0625 | 0.241699 | 0.276993 |

The following initial parameters have been used: the number of terms $N_T$=3; the number of variables included in a term $N_V$=2.

The stepwise algorithm found the following approximating model:

$$y(X) = -0.12598 + 1.2898 \cdot x_4 + 1.4408 \cdot x_1^3 - 1.8055 \cdot x_6^2 \cdot x_1;$$

The stepwise algorithm recognized and included in the approximating model only independent variables $\{x_1, x_4, x_6\}$ as the most significant ones. The algorithm also automatically found the best way to include significant variables $\{x_1, x_4, x_6\}$ into the regression model.

Comparison of experimental values $y_{exp}$ with predicted values y in the TABLE 1, and high values of regression statistics (multiple correlation=0.996847, F-Ratio=113.441) show that the approximating model fits experimental data with high level of adequacy.

The above sample confirms that recognizing the most significant design variables allows finding accurate approximations based on a subset of independent variables, which in turn, allows reduction of the number of necessary sample points. It is important to understand that each sample point is generated by a model evaluation that, possibly, requires hours of computational time.

Figure 3:
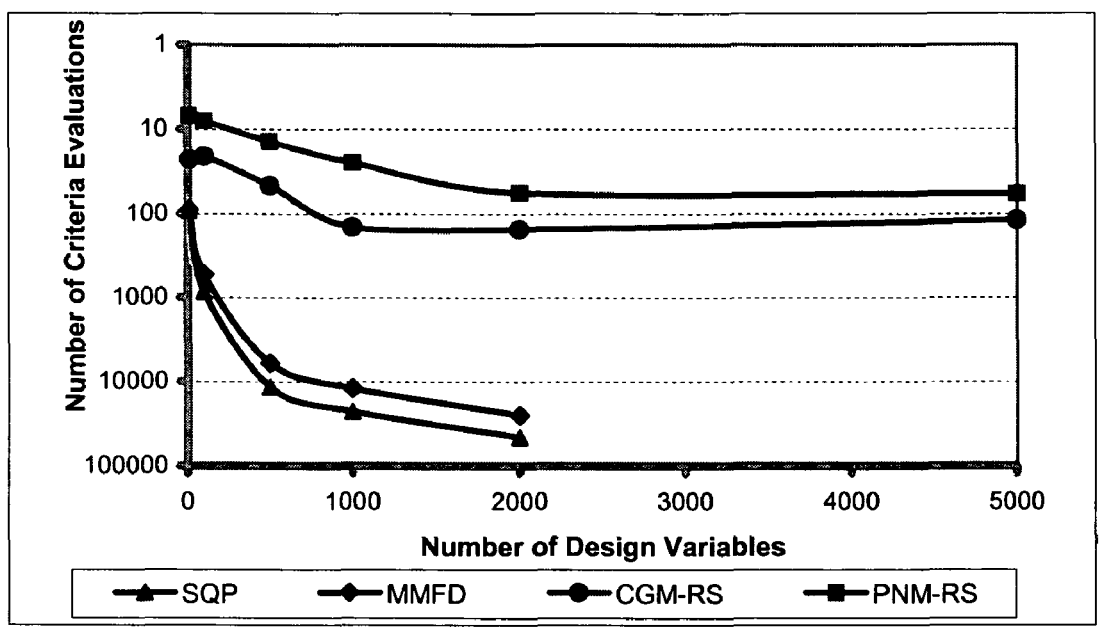
FIG. 3 compares computational efficiency of invented optimization algorithms CGM-RS and PNM-RS based on DIRSM with traditional gradient-based algorithms MMFD and SQP.

In order to demonstrate computational efficiency and scalability of DIRSM-based optimization algorithms, the optimization task (A.3.1) has been solved with a different number of design variables from 10 through 5000 (see A.3). The same variants of the optimization task have been solved also via traditional gradient-based methods MMFD and SQP not using DIRSM (see A.3). FIG. 3 allows comparing computational efficiency of different optimization algorithms. The number of model evaluations required by MMFD and SQP algorithms grows exponentially with increasing the task dimension. In contrast, the inventive algorithms CGM-RS and PNM-RS based on DIRSM require almost the same number of model evaluations for any task dimension, and optimize 10-800 times faster. This confirms that the "curse of dimensionality" issue has been successfully resolved by DIRSM for optimization tasks. Using Intermediate Points as Part of Pareto-optimal Solution Algorithms CGM, CGM-RS, PNM, PNM-RS use the same type of gradient-based numerical analysis iterating toward a Pareto-optimal point. Iteration involves calculation of additional intermediate points necessary for estimating objective functions and their gradients. The optimization step size is decreasing while approaching the Pareto frontier. So, most of the intermediate points calculated on last iterations are located at a relatively small distance from the Pareto frontier. This allows considering each intermediate point as a point-candidate, and anticipating that some of the intermediate points are Pareto optimal.

Figure 19:
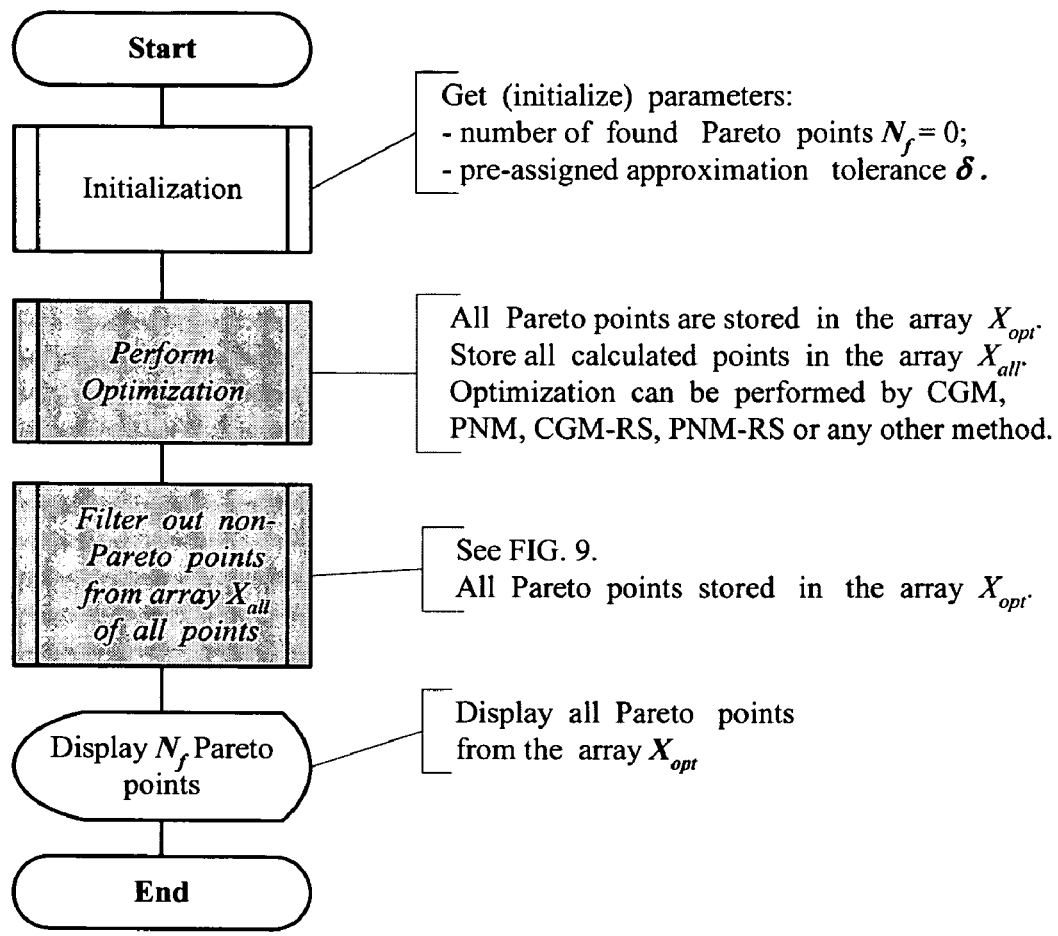
FIG. 19 is a flow diagram of reusing intermediate points as part of Pareto-optimal solution.

Reuse of intermediate points does not entail additional model evaluations. It requires only keeping all evaluated points in the memory. At the very end of the optimization process all optimal and intermediate points need to be compared to each other with respect to all objective functions (see the algorithm's flowchart on FIG. 19). As result of the comparison, all non-dominating, or in other words, non-Pareto optimal points are filtered out. The rest of points are Pareto-optimal (or dominating) with pre-assigned accuracy.

In order to demonstrate benefits of reusing the intermediate points the optimization task (A.4.1) has been solved by CGM algorithm (see A.4.)

The CGM algorithm spent 780 model evaluations in both cases. The regular CGM algorithm spent on average 15.6 model evaluations per Pareto optimal point, and found 50 optimal points (see FIG. 20A). Reuse of intermediate points allowed spending only 1.56 evaluations per Pareto optimal point, and finding 501 optimal points (see FIG. 20B). Note that the points uniformly cover the triangular area of Pareto optimal points, which confirms the high quality of the solution.

Figure 2A:
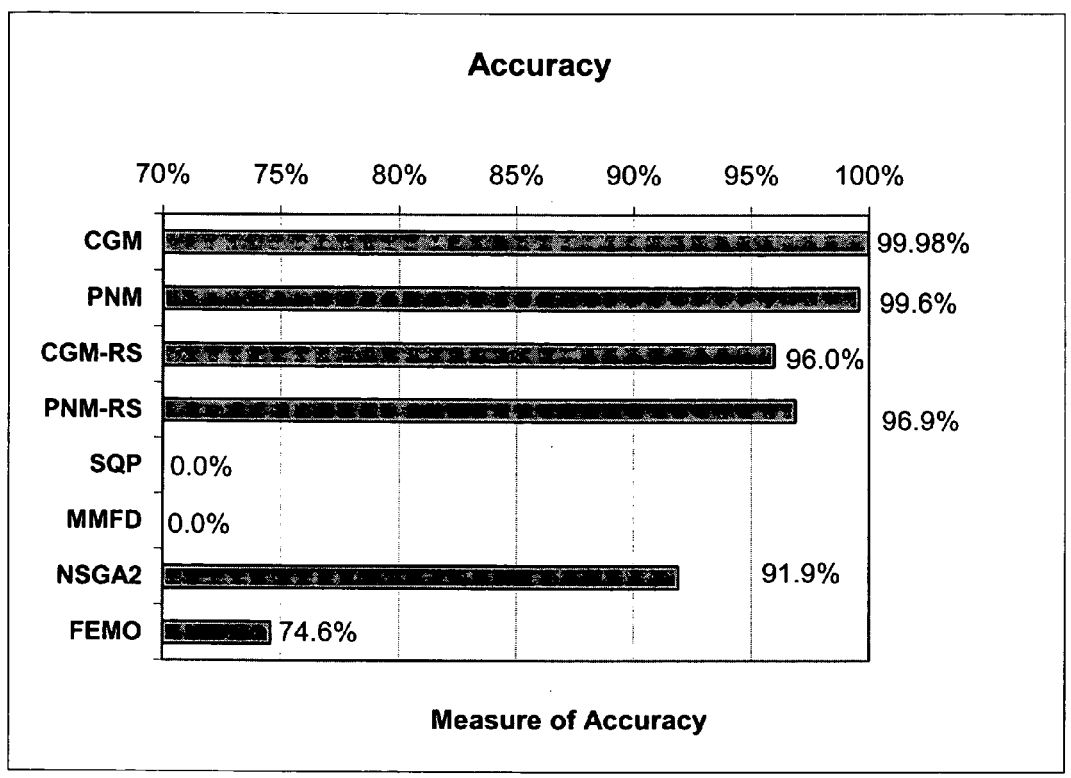
FIG. 2A compares accuracy of solutions of the task (A.1.1) found by inventive algorithms CGM, PNM, CGM-RS, PNM-RS, and competitive algorithms SQP, MMFD, NSGA2 and FEMO.
Figure 2B:
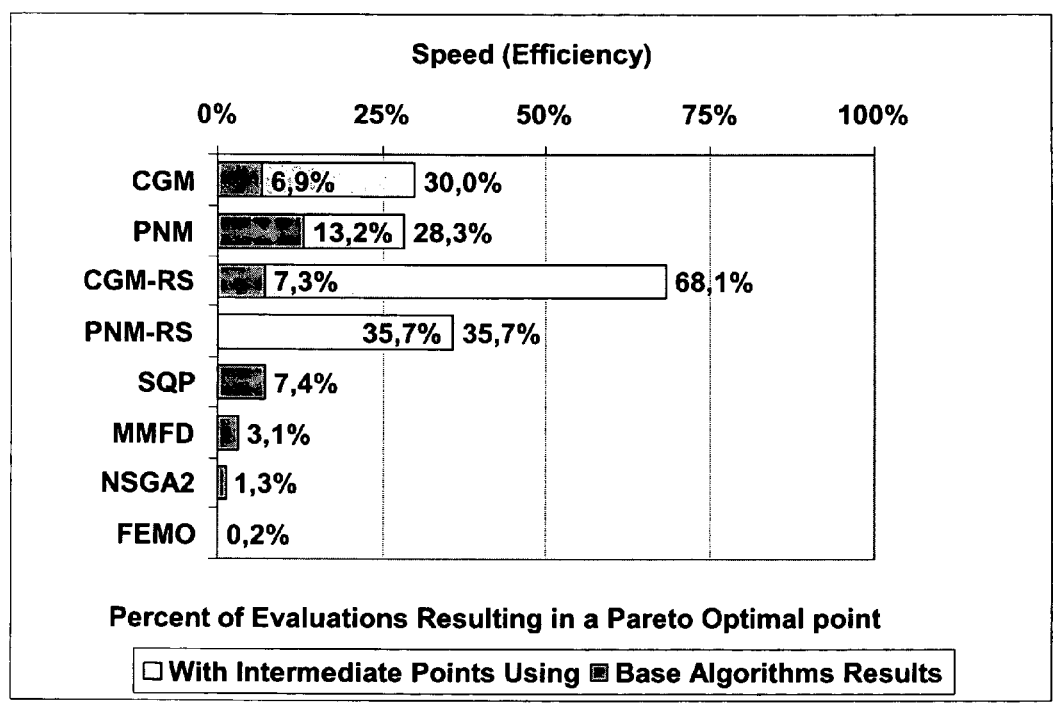
FIG. 2B compares computational efficiency of invented algorithms CGM, PNM, CGM-RS, and PNM-RS, and competitive algorithms SQP, MMFD, NSGA2 and FEMO.

FIG. 2B also illustrates benefits of reusing intermediate points for the multi-objective optimization task (A.1.1). The task is solved via CGM, CGM-RS, PNM, and PNM-RS methods, with rise of computational efficiency in 2-9 times when intermediate points are reused. PNM-RS shows equally high computational efficiency (3 evaluations per optimal point) with and without reusing intermediate points.

Traditional gradient-based optimization algorithms (SQP, MMFD, etc) had been the fastest known algorithms. Such algorithms spend 90-97% of function evaluations to approach the Pareto frontier, and only 3-10% of found points are Pareto optimal. On average, the algorithms spend 15-30 evaluations per optimal point for low-dimensional tasks. In comparison the inventive optimization algorithms have unprecedented efficiency with less than 2 evaluations per optimal point. All of the algorithms CGM, CGM-RS, PNM, and PNM-RS provide similar level of computational efficiency when they reuse intermediate points.

While the present invention has been described in connection with the illustrated embodiments, it will be appreciated and understood that modifications may be made without departing from the true spirit and scope of the invention which is limited only by the appended claims and their equivalents.

APPENDIX A. Sample tasks of Multi-Objective Optimization

A.1. Optimization Task with Non-Convex Pareto Frontier

Here is a particular sample of a small optimization task with two independent variables and two objective functions:

$$\text{Minimize: } F_1 = 1 - \exp[-(x_1 - 1/\sqrt{2})^2 - (x_2 - 1/\sqrt{2})^2]; \quad (A.1.1)$$

$$\text{Minimize: } F_2 = 1 + \exp[-(x_1 - 1/\sqrt{2})^2 - (x_2 - 1/\sqrt{2})^2];$$

$$-4 \leq x_1, x_2 \leq 4;$$

The optimization task (A.1.1) has a non-convex (straight) Pareto frontier. Such tasks are important in engineering practice, and are very difficult for traditional gradient-based optimization algorithms. We know the exact analytical solution of the task (see FIG. 1A), and this allows estimating and comparing accuracy of solutions found by different optimization methods.

Figure 1B:
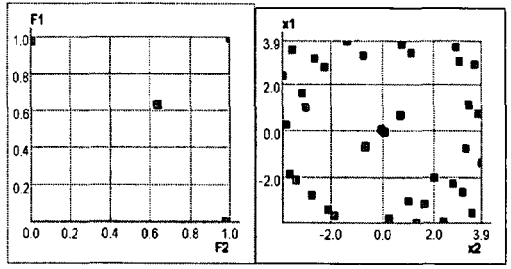
FIGS. 1B and 1C illustrate the inability of gradient-based algorithms Sequential Quadratic Programming (SQP) and Modified Method of Feasible Directions (MMFD) relying on a scalarization technique to find points of a non-convex part of Pareto front for the task (A.1.1)
Figure 1C:
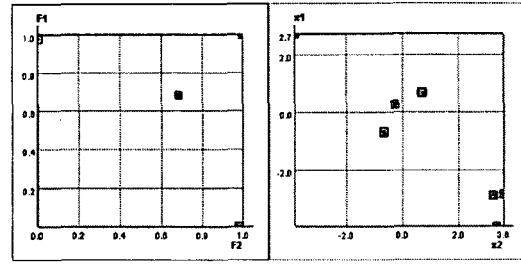
Figure 1D:
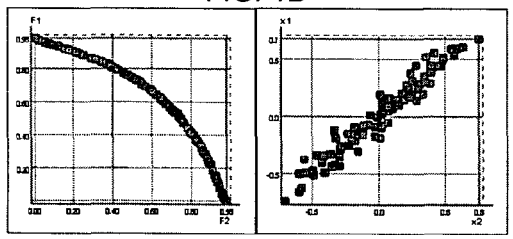
FIGS. 1D and 1E show solutions for the task (A. 1.1) found by genetic algorithms named Non-dominated Sorting Genetic Algorithm 2 (NSGA2) and Fair Evolutionary Multi-Objective Optimizer (FEMO). NSGA2 provides relatively high accuracy, but FEMO is not able to improve accuracy of the solution.
Figure 1E:
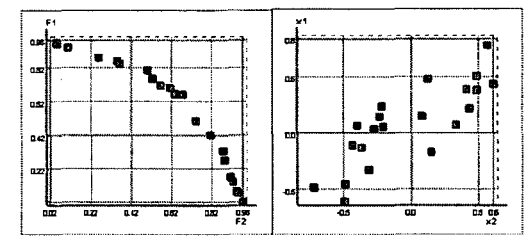
Figure 1F:
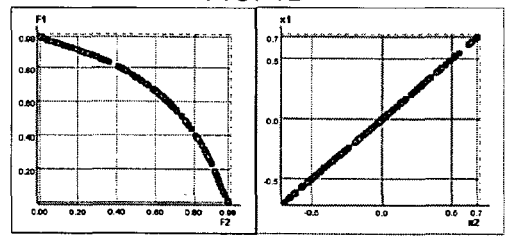
FIGS. 1F and 1G show solutions for the task (A.1.1) found by the inventive CGM and PNM algorithms. The solutions are identical with the exact solution shown on the FIG. 1A.
Figure 1G:
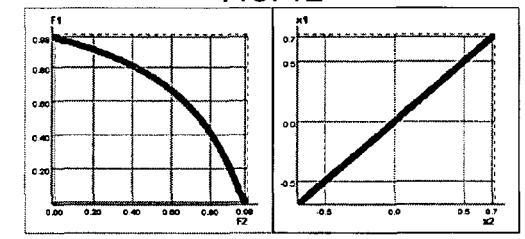
Figure 1H:
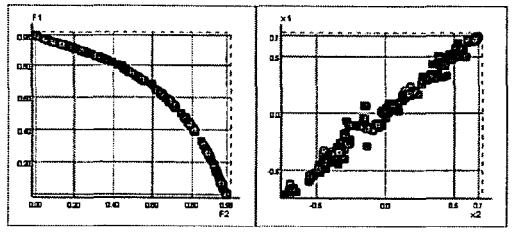
FIGS. 1H and 1I show solutions for the task (A.1.1) found by the inventive CGM-RS and PNM-RS algorithms employing the Dimensionally Independent Response Surface Method (DIRSM). The solutions are almost identical to the exact solution shown on the FIG. 1A.
Figure 1I:
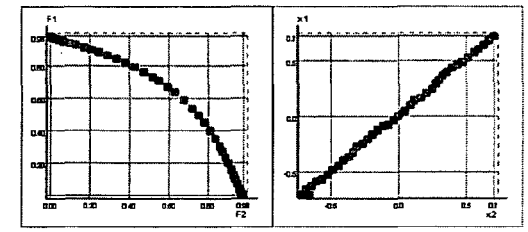

Comparison of FIG. 1A with FIGS. 1B-1C shows that gradient-based optimization methods SQP (Sequential Quadratic Programming) and MMFD (Modified Method of Feasible Directions) are not able to find the Pareto-frontier. Both methods employ a scalarization technique for the task (A.1.1.)

FIG. 2A compares accuracy of solutions of the task (A.1.1) found by the inventive algorithms CGM, PNM, CGM-RS, PNM-RS, and competitive algorithms SQP, MMFD, NSGA2 and FEMO. Solutions found by the inventive algorithms concur with the exact solution with an accuracy of 96-99.9%, which is much higher compared with competitive algorithms.

FIG. 2B compares computational efficiency of invented algorithms CGM, PNM, CGM-RS, and PNM-RS, and competitive algorithms SQP, MMFD, NSGA2 and FEMO. Computational efficiency is measured by percentage of evaluations generating Pareto optimal points for the task (A.1.1). Efficiency of invented algorithms is shown for two modes: with and without reusing of intermediate points. Invented algorithms are 2-100 times more efficient than competitive algorithms for the task (A.1.1).

A.2. Solving Multi-Objective Optimization Task by PNM Algorithm

The following task (A.2.1) has been solved by PNM algorithm:

$$\text{Minimize } f_1(X) = (1+g) \cdot \cos(x_1 \pi/2) \cdot \cos(x_2 \pi/2), \quad (A.2.1)$$

$$\text{Minimize } f_2(X) = (1+g) \cdot \cos(x_1 \pi/2) \cdot \sin(x_2 \pi/2),$$

$$\text{Minimize } f_3(X) = (1+g) \cdot \sin(x_1 \pi/2),$$

$$x_i \in [0;1], i=1, \ldots, n,$$

$$\text{where } g = \sum_{x_i \in 1,2,3} (x_i - 0.5)^2.$$

Figure 14A:
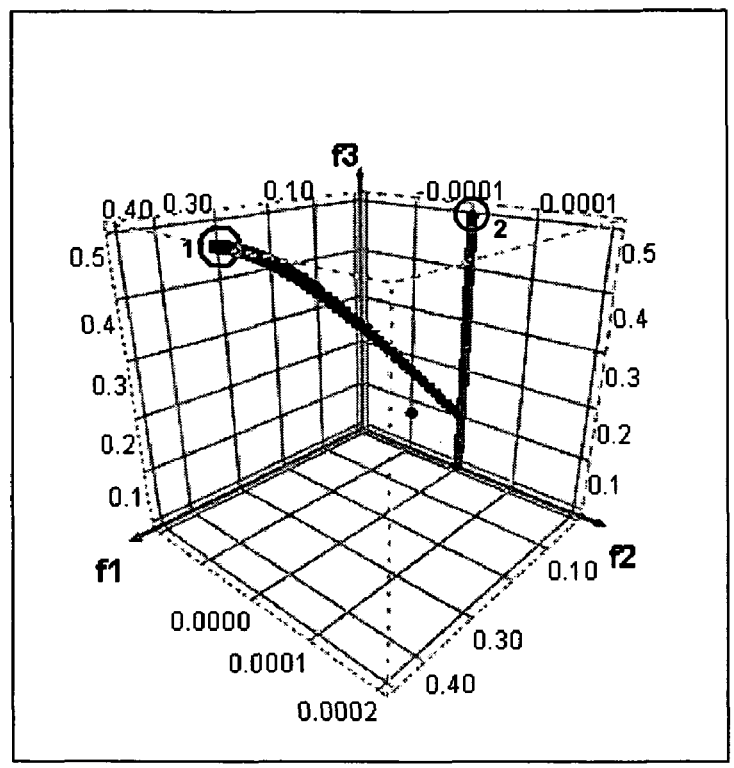
FIG. 14A shows criteria space projections of Pareto-optimal points found via PNM algorithm for the multi-objective optimization task (A.2.1)
Figure 14B:
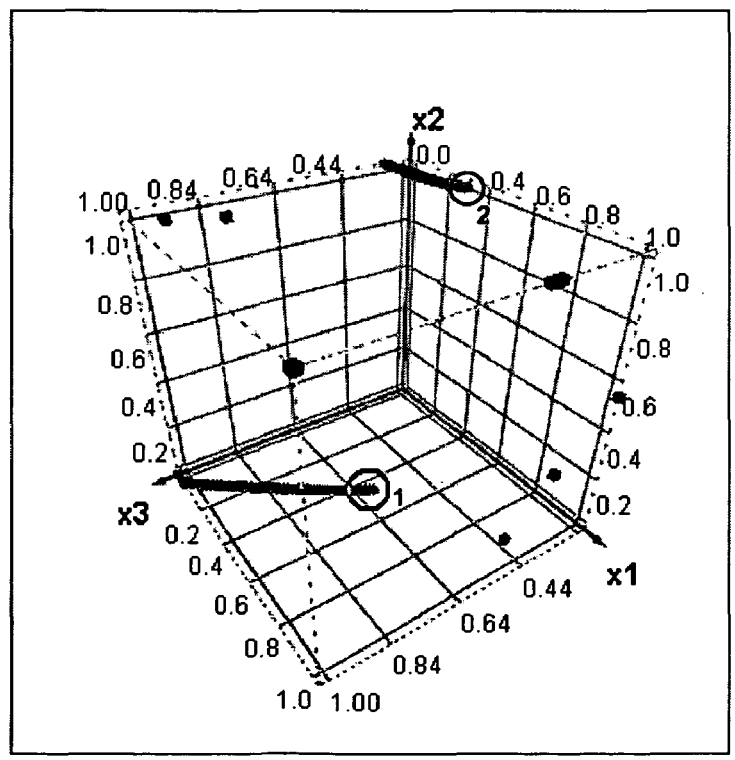
FIG. 14B shows design space projections of Pareto-optimal points found via PNM algorithm for the multi-objective optimization task (A.2.1)

FIGS. 14A-14B illustrate graphically the PNM technology. FIG. 14A shows Pareto-optimal points in criteria space, and FIG. 14B shows the same points in design space. According to the above-described approach, a few Pareto-optimal points have been found via CGM algorithm. After that two Pareto-optimal points were improved by the PNM algorithm with respect to some objective functions with high priority.

The first point selected for improvement is circled and marked by the number '1'. The point has been improved with respect to objective functions $f_1$ and $f_3$. The curve on FIGS. 14A-14B, started from the circled point, consists of 39 found by PNM algorithm Pareto-optimal points. Orientation of the curve on FIG. 14A allows one to see that each consequent point improves objective functions $f_1$ and $f_3$ a small value compared with the previous point, while each subsequent point stays on the Pareto surface.

The second point selected for improvement is also circled and marked by the number '2'. This point has been improved with respect to a single objective function $f_3$. 35 Pareto-optimal found points look like a vertical line, which is parallel to the $f_3$ axis on the FIG. 14A. This allows one to see that each consequent point improves the objective function $f_3$.

A.3. Solving Optimization Task by CGM-RS and PNM-RS Algorithms Based on DIRSM

Figure 21:
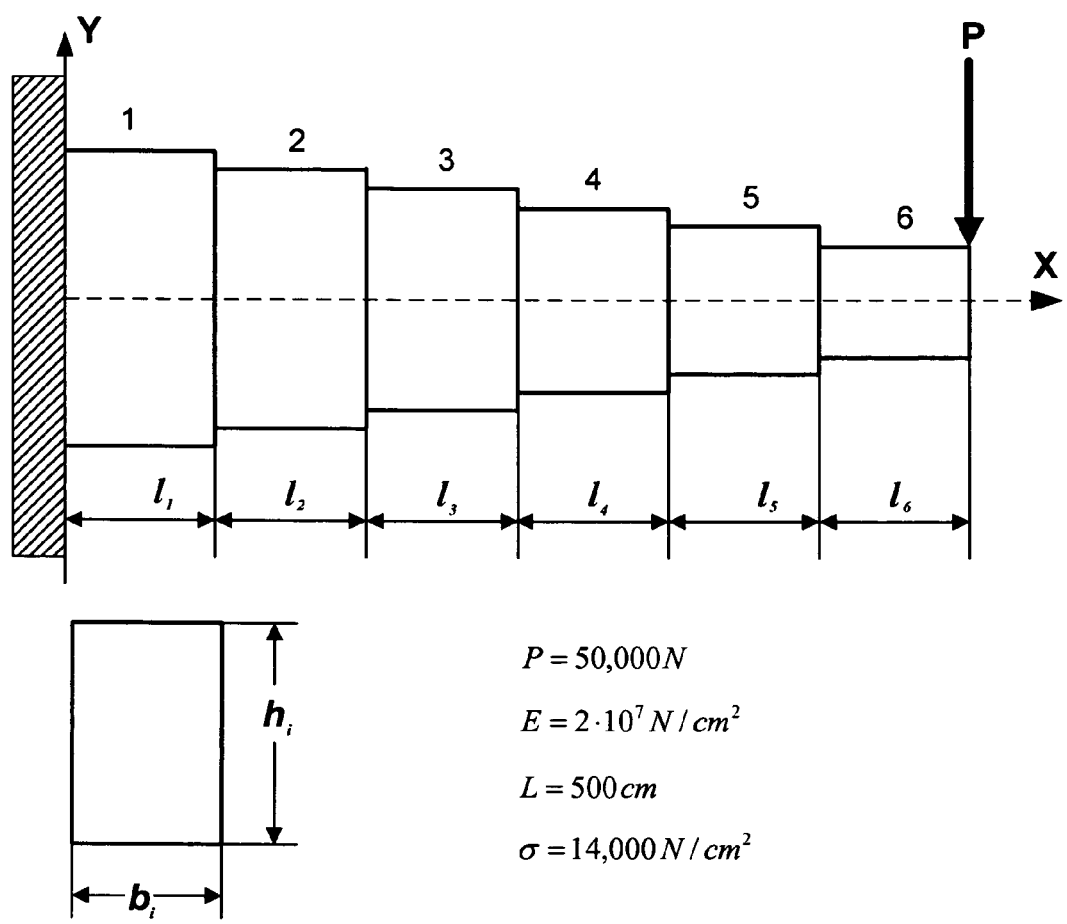
FIG. 21 shows a schema of a loaded straight beam divided into sections.

In order to demonstrate computational efficiency and scalability of DIRSM-based optimization algorithms, we solved the optimization task (A.3.1) for a loaded straight beam divided into sections (see the loading schema on FIG. 21) by the inventive CGM-RS and PNM-RS methods based on DIRSM. The same optimization task has been solved also via traditional gradient-based methods MMFD and SQP not using DIRSM.

$$\text{Minimize } \sigma_0 = \frac{M_0 \cdot h_0}{(2 \cdot I_0)} \quad (A.3.1)$$

Minimize $y_N$, where $N$ is the number of sections $$\text{Minimize } V = \sum_{i=1}^{N} b_i h_i l_i$$

$h_i \in [5; 70], \; b_i = h_i/20; \; w_i = h_i/10; \; i = 1, \ldots, N$

Stress $\sigma_0$, deflection $y_N$, and volume V need to be minimized within ranges for design variables determined in the above the task formulation. See loading schema on FIG. 21.

The optimization task (A.3.1) has been solved in two steps using two multi-objective optimization methods:
  CGM-RS starts from a random initial point, and improves all 3 objective functions $\sigma_0$, $y_N$, V until a Pareto-optimal point is found.
  PNM-RS starts from the Pareto-optimal point found by CGM-RS, and moves along the Pareto surface, which finds each sequential Pareto point using only a few evaluations of objective functions.

For example, the task (A.3.1) has been solved by CGM-RS and PNM-RS with a different number of design variables from 10 through 5000. CGM-RS and PNM-RS spent correspondingly just 20-150 and 7-58 model evaluations per Pareto-optimal point (see FIG. 3). This confirms that DIRSM is almost equally efficient with any number of design variables.

For comparison, take the gradient-based algorithms MMFD and SQP for task dimensions 10, 100, 500, 1000, and 2000 design variables. Algorithms MMFD and SQP calculate gradients by the finite difference method, which causes an exponential rise of spent model evaluations when the task dimension is increasing. As seen on FIG. 3, algorithms MMFD and SQP require 10-800 times more evaluations of objective functions as compared to the optimization methods CGM-RS and PNM-RS.

Figure 22:
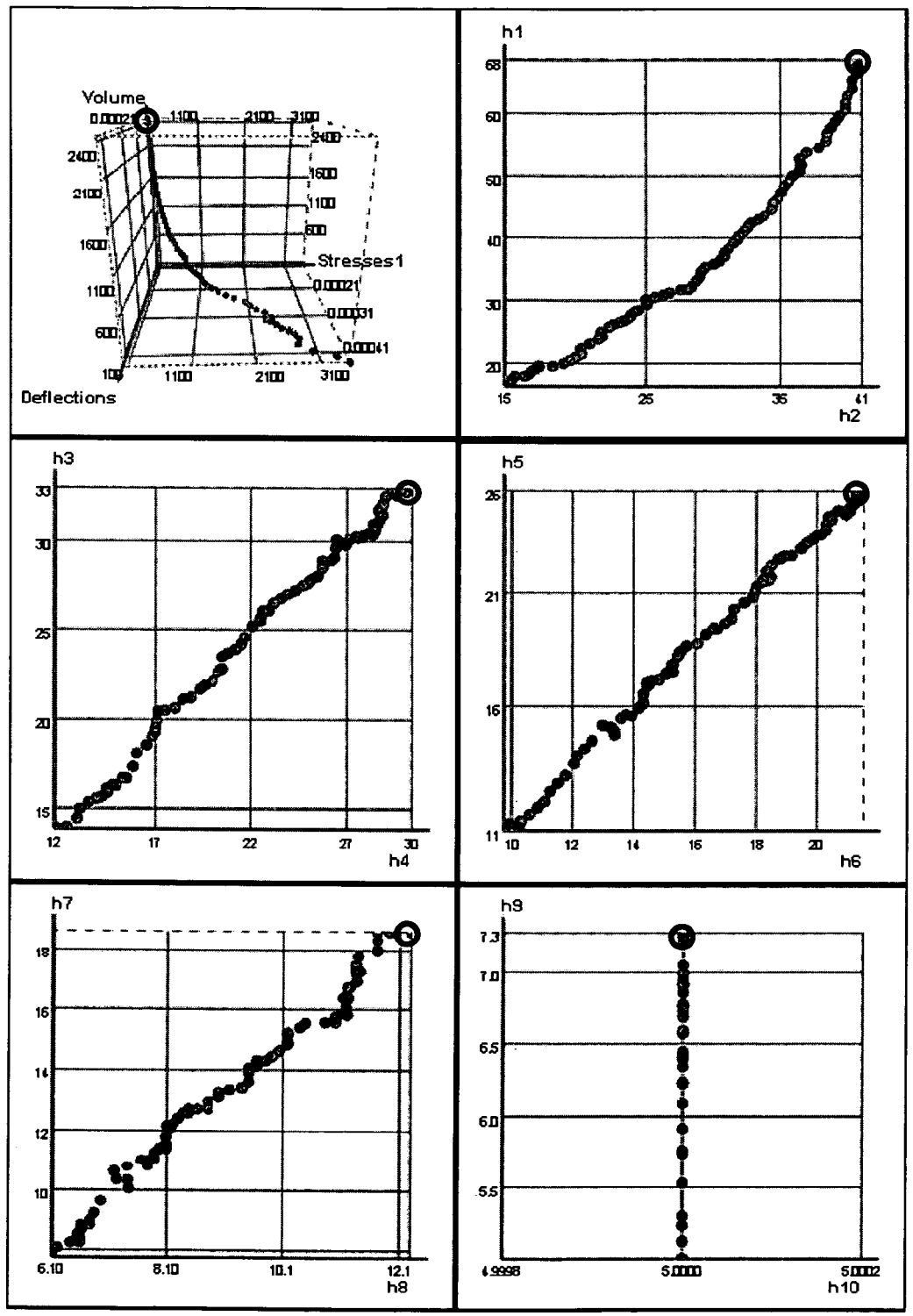
FIG. 22 shows Pareto-optimal points found by CGM-RS and PNM-RS algorithms for a straight beam divided into 10 sections.

FIG. 22 shows Pareto-optimal points found by CGM-RS and PNM-RS algorithms for the task (A.3.1) with the number of sections N=10.

A.4. Solving Multi-Objective Optimization Task with Reuse of Intermediate Points In order to demonstrate benefits of intermediate points reuse the optimization task (A.4.1) has been solved by CGM algorithm:

Minimize $f_1(X) = x_1^2 + (x_2-1)^2$, (A.4.1)

Minimize $f_2(X) = x_1^2 + (x_2+1)^2 + 1$,

Minimize $f_3(X) = (x_1-1)^2 + x_2^2 + 2$, $-2 < x_1, x_2 \leq 2$;

Reuse of intermediate points improves the quality of the solution, and increases computational efficiency 2-10 times (see FIGS. 20A-20B). See also detailed analysis of the sample in the section "Using Intermediate Points as Part of Pareto-optimal Solution."

The invention claimed is:

1. A computer system comprising:
  a processor;
  a display; and
  a memory system, comprising instructions, which, when executed, cause the computer, system to perform a multi-objective optimization of a computational simulation model of a physical system by Pareto navigator method, the method of stepping along a Pareto frontier in such a way that a few high priority objective functions $F_i(X)$, i=1,2..., $m^+$, $1 \leq m^+ < m$ are improving, where $m^+$ and m are finite positive integers, where said Pareto frontier is a set of points in the m-dimensional objective space those do not dominate each other with respect to said m objective functions; point A dominates point B if $F_i(A) \leq F_i(B)$, i=1,2..., m and at least for one of i $F_i(A) < F_i(B)$; the method comprising the steps of:
  a) determining output variables of said physical system that need to be optimized;
  b) describing said output variables of said physical system as minimized objective functions $F_i(X)$, i=1,2..., m, considered in an n-dimensional design space $X = \{x_1, x_2, \ldots, x_n\}$, $x^*_j \leq x_j \leq x^*_j$, j=1,..., n, where each $x_j$ is a design variable of said physical system, $x^*_j, x^*_j$ are finite numbers determining minimum and maximum values of each said design variable, the values entered by a user and based on technical characteristics of said physical system;
  c) assigning a high priority status to a subset of $m^+ < m$ objective functions;
  d) specifying, from said Pareto frontier, a known Pareto optimal point previously found by any multi-objective optimization algorithm which is optimal with respect to all said m objective functions and needs to be improved with respect to said $m^+$ high priority objective functions;
  e) estimating a gradient for each of said $m^+$ high priority objective functions on said Pareto optimal point specified in step d) by any algorithm of gradient estimation;
  f) determining a direction of simultaneous improvement of all said $m^+$ high priority objective functions based on gradients specified in step e) by any algorithm which allows a determination of a direction of simultaneous improvement for several objective functions;
  g) assigning a step size $S_1$ for improvement of said $m^+$ high priority objective functions, where said step size $S_1$ is a distance between start point and end point of a step in the n-dimensional design space $X = \{x_1, x_2, \ldots, x_n\}$, $x^*_j \leq x_j \leq x^*_j$, j=1,..., n determined in such a way that said end point remains inside of said design space, and $0 < S_1 < \delta_{PN}$, where $\delta_{PN}$ is a pre-assigned navigation approximation tolerance;
  h) starting from said Pareto optimal point specified in step d) and performing a step with said step size $S_1$ in the direction determined in step f), and declaring a found point as an improved point, which is moved in the desired direction;
  i) starting an optimization process from said improved point found in step h), and declaring said improved point as an initial current point;
  j) estimating a gradient for each of said m objective functions on said initial current point specified in step i) by any algorithm of gradient estimation;
  k) determining a direction of simultaneous improvement of all said m objective functions based on gradients specified in step j) by any algorithm which determines a direction of simultaneous improvement for several objective functions;
  l) assigning a step size $S_2$ for improvement of all said m objective functions, where said step size $S_2$ is a distance between the start point and the end point of a step in the n-dimensional design space $X = \{x_1, x_2, \ldots, x_n\}$, $x^*_j \leq x_j \leq x^*_j$, j=1,..., n determined in such a way that said end point remains inside of said design space, and $0<S_2<\delta_{PN}$, where $\delta_{PN}$ is the pre-assigned navigation approximation tolerance;

m) starting from said initial current point and performing a step with step size $S_2$ in the direction specified in step k), and declaring a found point as a new point-candidate;

n) comparing said initial current point with said point-candidate;

o) if said initial current point is not dominated by said point-candidate with respect to all said m objective functions, then declaring said initial current point as Pareto optimal point, and proceed to step s);

p) assigning a new step size $S_2=S_2$ *t, where t is a pre-assigned number $0<t<1$;

q) if the new step size $S_2 <\delta_a$ where $\delta_a$ is a pre-assigned approximation tolerance then declaring said initial current point as Pareto optimal point, and proceed to step s);

r) declaring said point-candidate as a subsequent current point, and repeating steps m)-r) with the new step size $S_2$ and Initial current point replaced by subsequent current point;

s) interpreting said declared Pareto optimal point in terms of said physical system.

2. The computer system of claim 1 wherein the Pareto navigator method further comprising the step of sequential use of each Pareto optimal point declared as a start point for a next step along the Pareto frontier in said direction of simultaneous improvement of said high priority objective functions until a pre-assigned number of steps has been made, or said high priority objective functions have been improved over pre-assigned values.

3. The computer system of claim 2 wherein the Pareto navigator method further comprising the step of sequentially processing a plurality of known Pareto optimal points specified from said Pareto frontier.

4. The computer system of claim 1 wherein the Pareto navigator method further comprising reuse of intermediate points as part of an optimal solution, comprises the steps of:

t) saving all said intermediate points in memory where said intermediate points are points evaluated to estimate all said gradients by any method of gradients estimation;

u) comparing all saved intermediate points against each other, and against said known Pareto optimal point and said declared Pareto optimal point with respect to all objective functions;

v) filtering out all non-dominating points, declaring the rest of points as Pareto optimal points, and declaring at least two additional Pareto optimal points.

* * * * *